(12) United States Patent
Sonoura et al.

(10) Patent No.: US 10,730,462 B2
(45) Date of Patent: Aug. 4, 2020

(54) UNMANNED TRANSPORT VEHICLE

(71) Applicant: Kabushiki Kaisha Toshiba, Minato-ku (JP)

(72) Inventors: Takafumi Sonoura, Yokohama (JP); Daisuke Yamamoto, Kawasaki (JP); Hideki Ogawa, Shinagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 197 days.

(21) Appl. No.: 16/105,224

(22) Filed: Aug. 20, 2018

(65) Prior Publication Data

US 2019/0202388 A1 Jul. 4, 2019

(30) Foreign Application Priority Data

Jan. 4, 2018 (JP) .................................. 2018-000318

(51) Int. Cl.
*B60R 19/40* (2006.01)
*B60R 19/02* (2006.01)
*G06Q 50/28* (2012.01)
*G06Q 10/08* (2012.01)

(52) U.S. Cl.
CPC ............ *B60R 19/40* (2013.01); *B60R 19/023* (2013.01); *G06Q 10/08* (2013.01); *G06Q 50/28* (2013.01)

(58) Field of Classification Search
CPC ...... B60R 19/40; B60R 19/023; G06Q 50/28; G06Q 10/08
See application file for complete search history.

(56) References Cited

U.S. PATENT DOCUMENTS 7,066,291 B2 6/2006 Martins et al.
2005/0110284 A1* 5/2005 Browne .................. B60R 19/40
293/118

FOREIGN PATENT DOCUMENTS

| JP | 60-191569 U | 12/1985 |
| JP | 61-249314 | 11/1986 |
| JP | 64-48688 U | 3/1989 |
| JP | 4-256106 | 9/1992 |

* cited by examiner

*Primary Examiner* — D Glenn Dayoan
*Assistant Examiner* — Melissa Ann Bonifazi
(74) *Attorney, Agent, or Firm* — Oblon, McClelland, Maier & Neustadt, L.L.P.

(57) ABSTRACT

According to one embodiment, an unmanned transport vehicle includes a vehicle body, a connector, a bumper, and a bumper driver. The vehicle body includes a moving mechanism and a moving mechanism driver. The moving mechanism driver is configured to drive the moving mechanism. The connector is at the vehicle body and connectable to a transport-object. The bumper is adjacent to the vehicle body in a first direction. The bumper includes a collision detection sensor. The bumper is extendable and contractible in a second direction. The second direction intersects the first direction. The bumper driver is configured to extend and contract the bumper in the second direction by moving at least a portion of the bumper in the second direction.

16 Claims, 21 Drawing Sheets

UNMANNED TRANSPORT VEHICLE

CROSS-REFERENCE TO RELATED APPLICATION

This application is based upon and claims the benefit of priority from Japanese Patent Application No. 2018-000318 filed on Jan. 4, 2018, the entire contents of which are incorporated herein by reference.

FIELD

Embodiments described herein relate generally to an unmanned transport vehicle.

BACKGROUND

In the field of logistics, there is a demand for labor saving to save labor and costs. For example, as a method of automating transport of a transport-object such as a basket truck, a method of transporting the transport-object by an unmanned transport vehicle has been proposed. Further improvement in obstacle detection capability of such an unmanned transport vehicle is desired.

DETAILED DESCRIPTION

Figure 1:
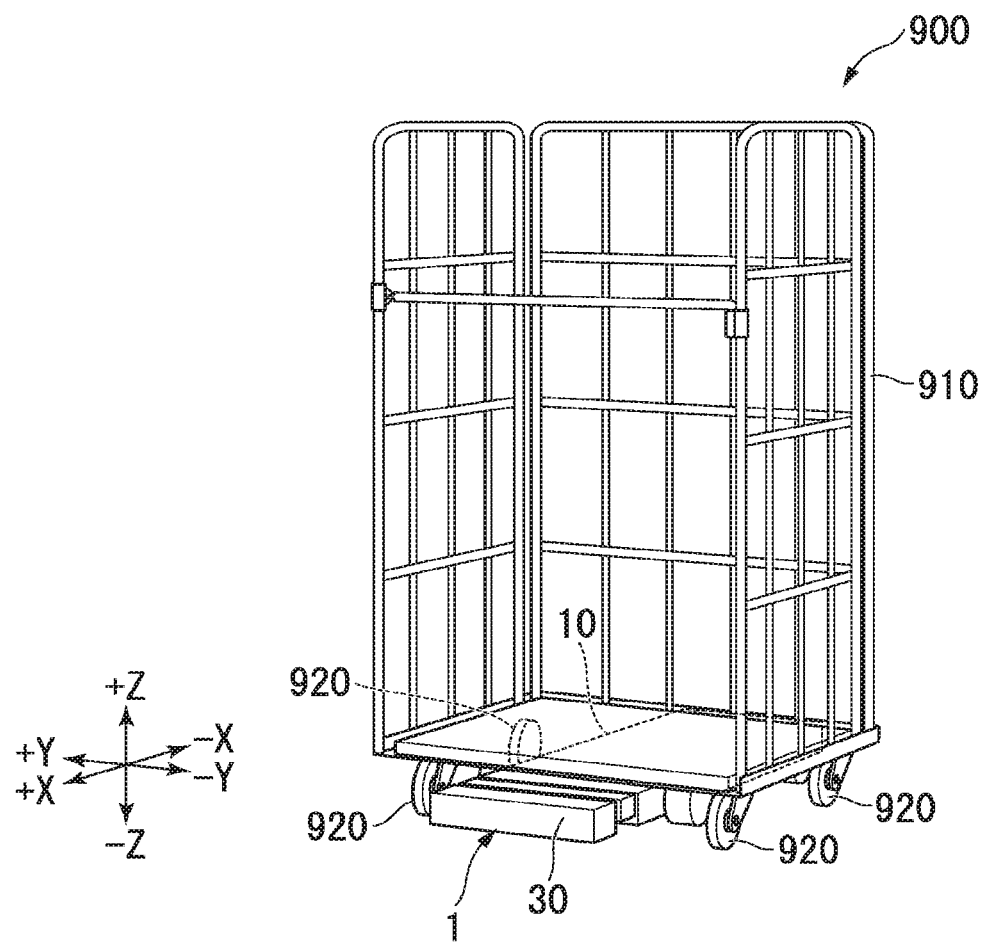
FIG. 1 is a perspective view showing an example of an unmanned transport vehicle and a transport-object of a first embodiment.

According to one embodiment, an unmanned transport vehicle includes a vehicle body, a connector, a bumper, and a bumper driver. The vehicle body includes a moving mechanism and a moving mechanism driver. The moving mechanism driver is configured to drive the moving mechanism. The connector is at the vehicle body and connectable to a transport-object. The bumper is adjacent to the vehicle body in a first direction. The bumper includes a collision detection sensor. The bumper is extendable and contractible in a second direction. The second direction intersects the first direction. The bumper driver is configured to extend and contract the bumper in the second direction by moving at least a portion of the bumper in the second direction.

Hereinafter, an unmanned transport vehicle of the embodiment will be described with reference to the drawings. In the following description, components having the same or similar function are denoted by the same references. Duplicate description of these components may be omitted. In the specification, the term "on the basis of XX" represents "based at least on XX" and includes the case of being based on any other element in addition to XX. In addition, the term "on the basis of XX" is not limited to "based directly on XX", but also represents "based on something that is acquired by an arithmetic operation or other process being performed on XX". Here, "XX" is an arbitrary element (for example, arbitrary information).

In addition, first, a +X direction, a −X direction, a +Y direction, a −Y direction, a +Z direction, and a −Z direction will be defined. The +X direction, the −X direction, the +Y direction, and the −Y direction are directions along a floor face on which an unmanned transport vehicle 1 moves. The +X direction is, for example, one moving direction of an unmanned transport vehicle 1 and sometimes referred to as a "forward." The +X direction is an example of a "first direction." The −X direction is a direction opposite to the +X direction, and sometimes referred to as "rearward." In a case where the +X direction and the −X direction are not distinguished, an "X direction" is simply referred to. The +Y direction and the −Y direction are directions intersecting the X direction (for example, directions substantially perpendicular thereto), and may be referred to as a vehicle width direction of a vehicle body 10 or a "toward a lateral side" in some cases. The +Y direction and the −Y direction are opposite to each other. The +Y direction is an example of a "second direction." The −Y direction is an example of a "third direction." In a case where the +Y direction and the −Y direction are not distinguished, a "Y direction" is simply referred to. The +Z direction and the −Z direction are directions intersecting the X direction and the Y direction (for example, directions that are substantially perpendicular thereto) and, for example, are vertical directions. The +Z direction is a direction going upward. The −Z direction is a direction opposite to the +Z direction. In a case where the +Z direction and the −Z direction are not distinguished, a "Z direction" is simply referred to. For convenience of description, terms such as "front side," "rear side," "lateral side," "vehicle width direction," and the like as used in the specification are expressed from the viewpoint with reference to one moving direction of the unmanned transport vehicle 1. However, the moving direction of the unmanned transport vehicle 1 is not limited to the +X direction. The unmanned transport vehicle 1 may be movable in the −X direction, the +Y direction, or the −Y direction. Therefore, the "first direction," the "second direction," and the "third direction" referred to in the specification are not limited to the +X direction, the +Y direction, and the −Y direction, and directions different from these may correspond thereto.

First Embodiment

FIG. 1 is a perspective view showing an example of the unmanned transport vehicle 1 and a transport-object 900 of a first embodiment. The unmanned transport vehicle 1 is, for example, an autonomous moving truck in which manipulation by an operator is unnecessary and is an autonomous moving truck of a line-less type in which lines drawn on the floor face or the like are unnecessary. The unmanned transport vehicle 1 is, for example, a low-floor type automatic guided vehicle (AGV), which enters below the transport-object 900, is connected to the transport-object 900, and then transports the transport-object 900. However, the unmanned transport vehicle 1 is not limited to the above example, and may be another type of unmanned transport vehicle. For example, the unmanned transport vehicle 1 may be one operated by an operator.

The transport-object 900 is, for example, a basket truck such as a roll box pallet (RBP). The transport-object 900 includes, for example, a loading portion 910 on which loads are loaded, and a plurality of casters (wheels) 920 which support the loading portion 910 from below. The transport-object 900 is not limited to a basket truck. Therefore, the loading portion 910 may be generally referred to as a "transport-object main body."

Figure 2:
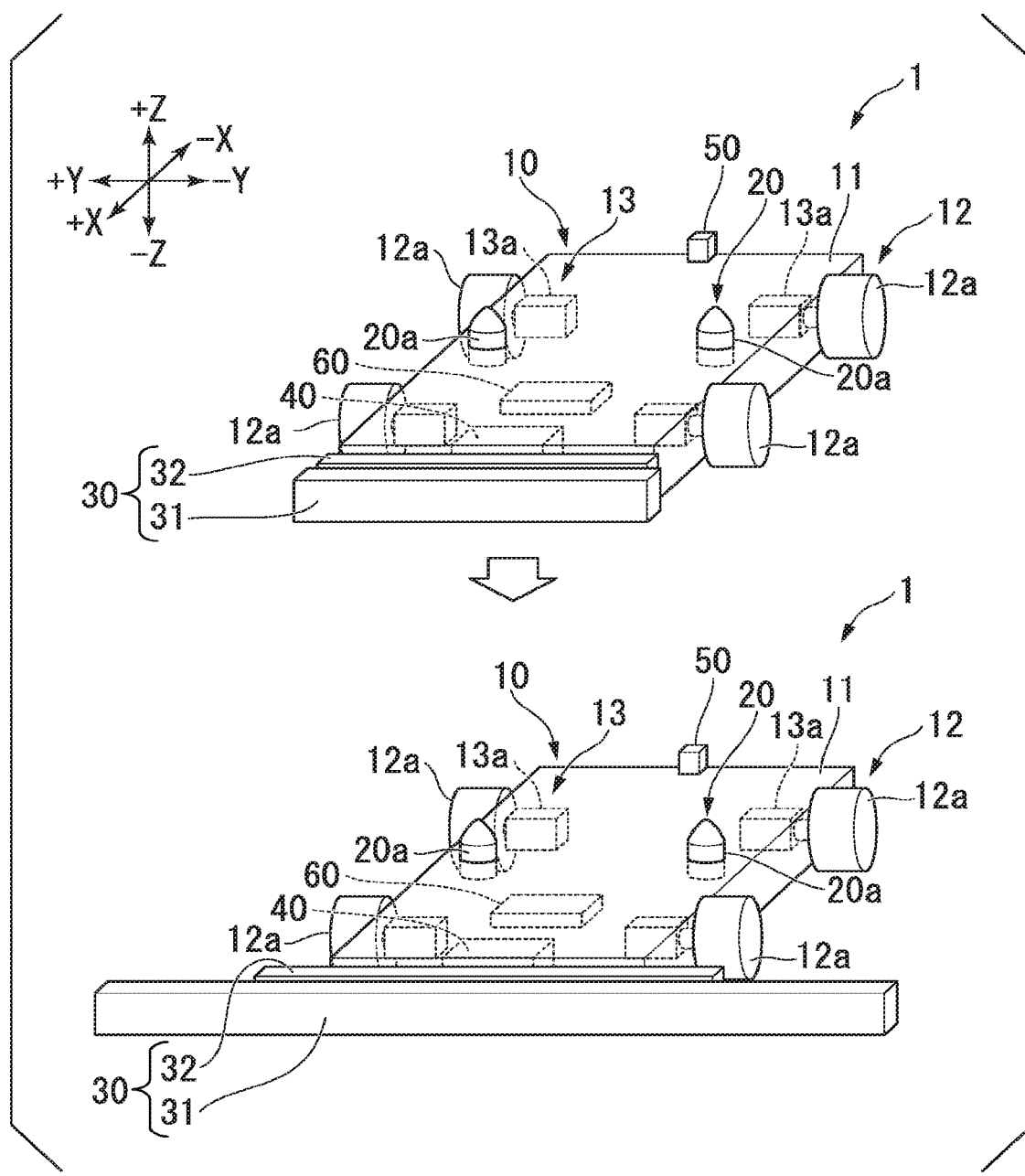
FIG. 2 is a perspective view showing the unmanned transport vehicle of the first embodiment.

FIG. 2 is a perspective view showing the unmanned transport vehicle 1 of the present embodiment. The unmanned transport vehicle 1 includes, for example, a vehicle body 10, a connector 20, a bumper 30, a bumper driver 40, a rear monitor 50, and a controller 60. An upper part in FIG. 2 shows the unmanned transport vehicle 1 in which the bumper 30 is in a contracted state. A lower part in FIG. 2 shows the unmanned transport vehicle 1 in which the bumper 30 is in an extended state. In FIG. 2, the bumper 30 is schematically showed.

The vehicle body 10 includes a vehicle body case 11, a moving mechanism 12, and a moving mechanism driver 13. The vehicle body case 11 forms an outer case of the vehicle body 10. The moving mechanism 12 is, for example, a traveling mechanism including a plurality of wheels 12a, but may be other types of moving mechanism. The moving mechanism driver 13 is provided in the vehicle body case 11 and drives the moving mechanism 12. For example, the moving mechanism driver 13 includes axle motors 13a that rotate the wheels 12a. Further, the moving mechanism driver 13 includes a steering mechanism which changes a steering angle of the wheels 12a. The moving mechanism driver 13 moves the vehicle body 10 to a desired position by driving the moving mechanism 12. The vehicle body 10 is formed to have a thickness such that the vehicle body 10 can enter below the loading portion 910 of the transport-object 900. For example, the vehicle body 10 enter between the two casters 920 of the transport-object 900 (see FIG. 1).

The connector 20 is provided on the vehicle body 10 and is detachably connected to the transport-object 900. The term "connect" as used in the specification application has a broad meaning of "making a connection between two objects," and engaging with (for example, hanging) the transport-object 900 or supporting the transport-object 900 (for example, lifting the transport-object 900 from below) also corresponds thereto. In this embodiment, the connector 20 includes an engaging portion 20a protruding toward the transport-object 900 and engaging with the transport-object 900. The unmanned transport vehicle 1 can tow the transport-object 900 by engaging the engaging portion 20a with the transport-object 900. The connector 20 is not limited to the example described above, and may be a lift mechanism which lifts the transport-object 900 from below, or may be mechanisms of other types.

The bumper 30 is disposed in the front side (on a +X direction side) of the vehicle body 10. That is, the bumper 30 is adjacent to the vehicle body 10 in the +X direction. The bumper 30 includes, for example, a bumper structure 31 and a bumper support 32. The bumper structure 31 includes a collision detection sensor 74 described later and detects contact with an obstacle. The bumper support 32 is provided between the bumper structure 31 and the vehicle body 10, and supports the bumper structure 31. The bumper 30 is extendable and contractible in the Y direction (vehicle width direction). Further, a specific structural example of the bumper 30 will be described below.

The bumper driver 40 extends and contracts the bumper 30 in the Y direction by moving at least a portion of the bumper 30 in the Y direction. For example, the bumper driver 40 is a motor that drives a helical gear. The helical gear engages with a helical rack provided on the bumper 30. However, a configuration of the bumper driver 40 is not limited to the above example.

Figure 3:
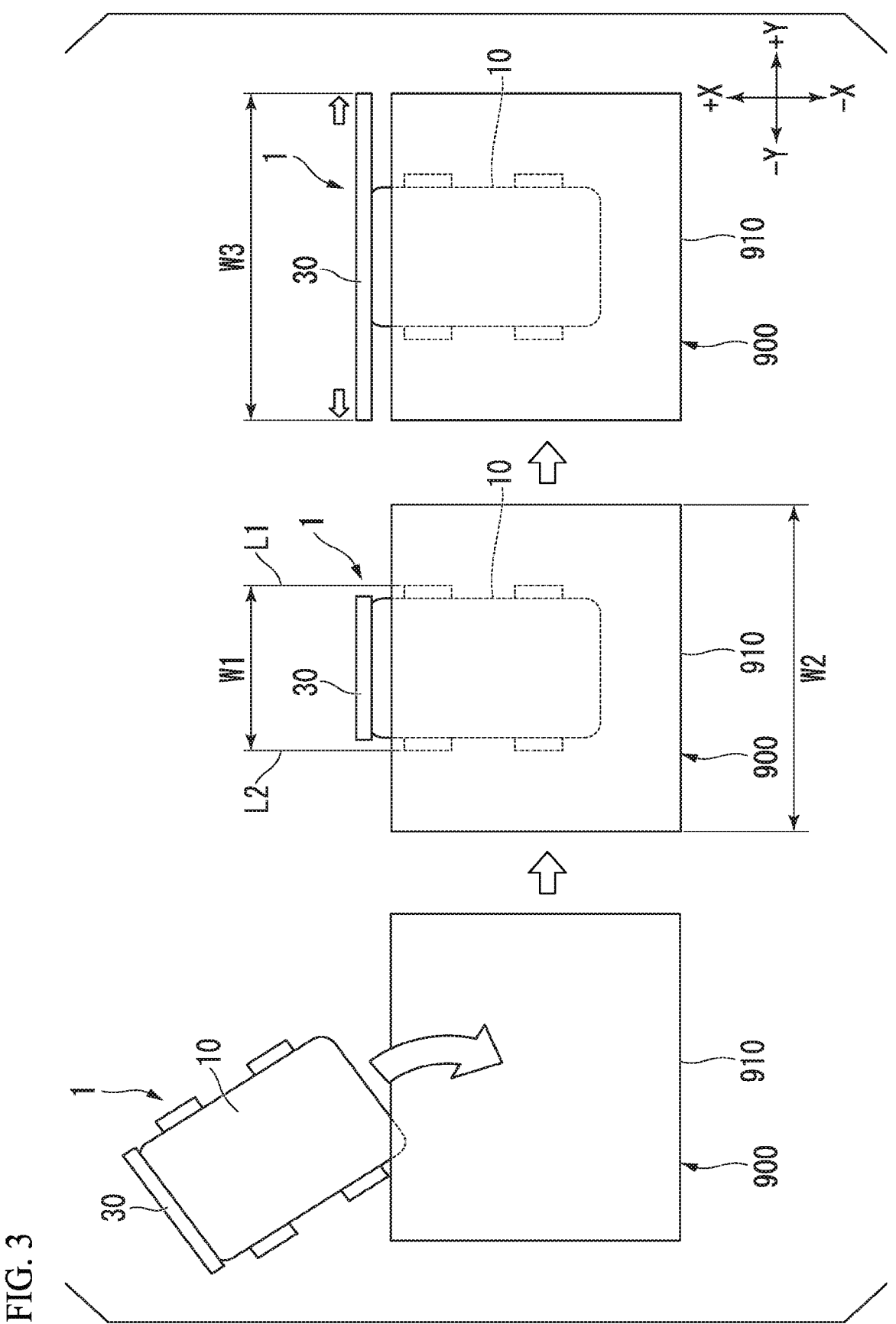
FIG. 3 is a plan view showing an example of a change of a form of the unmanned transport vehicle of the first embodiment.

FIG. 3 is a plan view showing an example of a change of a form of the unmanned transport vehicle 1. A left part in FIG. 3 shows a view in which the unmanned transport vehicle 1 enters below the loading portion 910 of the transport-object 900. A central part in FIG. 3 shows the unmanned transport vehicle 1 having entered below the loading portion 910 of the transport-object 900 and shows the contracted state of the bumper 30. A right part in FIG. 3 shows the unmanned transport vehicle 1 having enters below the loading portion 910 of the transport-object 900 and shows the extended state of the bumper 30.

The bumper driver 40 moves at least a portion of the bumper 30 between a first position in which the at least a portion of the bumper 30 is within a width of the vehicle body 10 in the Y direction and a second position in which the at least a portion of the bumper 30 protrudes toward an outer side of the vehicle body 10 in the Y direction with respect to a side surface of the vehicle body 10. The expression "within the width of the vehicle body 10" means a region between a virtual line L1 passing through an edge on the +Y direction side of the vehicle body 10 in the X direction and a virtual line L2 passing through an edge on the −Y direction side of the vehicle body 10 in the X direction. The edge on the +Y direction side (or −Y direction side) of the vehicle body 10 may be an edge of the wheel 12a, an edge of the vehicle body case 11, or an edge of other parts. The bumper driver 40 moves at least a portion of the bumper 30 to the second position in a case where a width W2 of the transport-object 900 is larger than a width W1 of the unmanned transport vehicle (for example, width of the vehicle body 10) in the Y direction. The expression "width W2 of the transport-object 900" means, for example, a width of the loading portion 910.

Returning to FIG. 2, a further description follows. The rear monitor 50 is provided at an end portion in the −X direction side of the vehicle body 10. The rear monitor 50 is, for example, a camera that captures images of the transport-object 900, but may be a laser range finder (LRF) that can irradiate the transport-object 900 with a laser. In a process in which the unmanned transport vehicle 1 approaches the transport-object 900 (for example, a state in the left part of FIG. 3), the rear monitor 50 acquires information relating to the width W2 of the transport-object 900 in the Y direction (hereinafter simply referred to as the width W2 of the transport-object 900). The "information relating to the width W2 of the transport-object 900" is images captured by imaging the transport-object 900 or measurement results of reflected waves of a laser in a case where the transport-object 900 is irradiated with the laser. However, the "information relating to the width W2 of the transport-object 900" is not limited to the above example. The rear monitor 50 is an example of an "information acquirer." The rear monitor 50 outputs information relating to the acquired width W2 of the transport-object 900 to the controller 60.

The controller 60 controls the entirety of the unmanned transport vehicle 1. For example, the controller 60 controls movement of the vehicle body 10, connection of the connector 20 to the transport-object 900, extension and contraction of the bumper 30, and the like.

Figure 4:
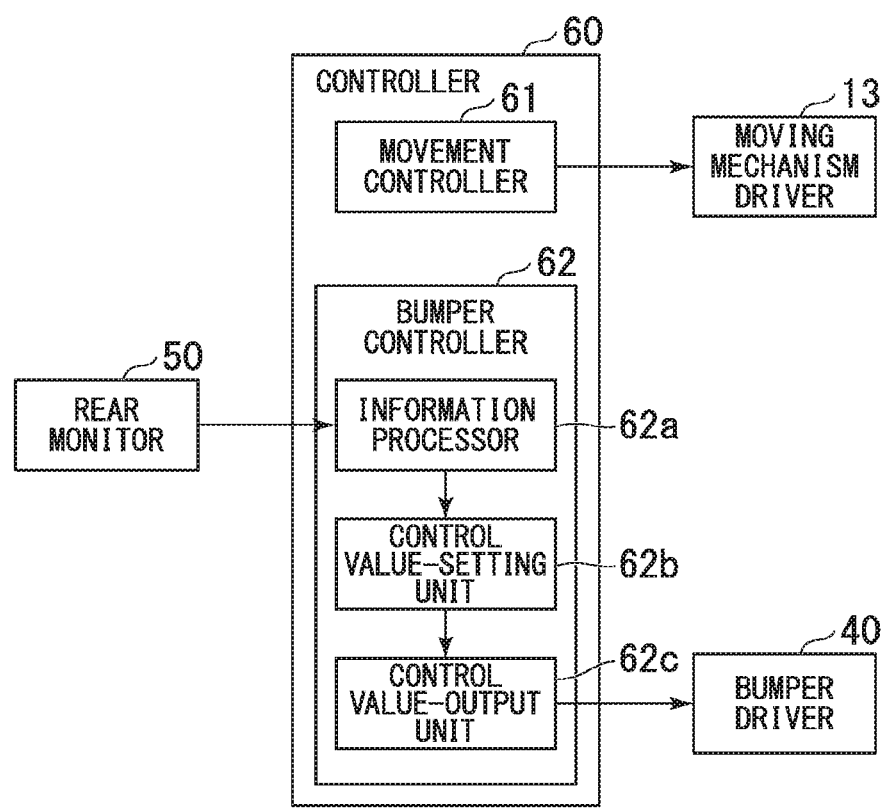
FIG. 4 is a block diagram showing a functional configuration of a controller of the first embodiment.

FIG. 4 is a block diagram showing a functional configuration of the controller 60. The controller 60 includes, for example, a movement controller 61 which controls the moving mechanism driver 13, and a bumper controller 62 which controls the bumper driver 40. At least a part of each of functional units of the controller 60 (for example, the movement controller 61 and the bumper controller 62) is realized, for example, when a hardware processor such as a central processor (CPU), graphics processor (GPU), or the like executes a program (software) stored in a storage. In addition, some or all of the functional units (for example, the movement controller 61 and the bumper controller 62) of the controller 60 may be realized by hardware (circuitry) such as a large scale integration (LSI), an application specific integrated circuit (ASIC), a field-programmable gate array (FPGA), or may be realized by cooperation of software and hardware.

The bumper controller 62 includes, for example, an information processor 62a, a control value-setting unit 62b, and a control value-output unit 62c.

The information processor 62a detects the width W2 of the transport-object 900 on the basis of information (information relating to the width W2 of the transport-object 900) input to the controller 60 from the rear monitor 50. For example, in a case where image captured by the transport-object 900 is input from the rear monitor 50, the information processor 62a performs image processing for the image, and identifies the edge on the +Y direction side and the edge on the −Y direction side of the transport-object 900 on the image, thereby detecting the width W2 of the transport-object 900. On the other hand, in a case where a measurement result of reflected waves of the laser of the LRF are input from the rear monitor 50, the information processor 62a identifies the edge on the +Y direction side and the edge on the −Y direction side of the transport-object 900 on the basis of the reflection degree of the laser light, thereby detecting the width W2 of the transport-object 900. The information processor 62a outputs information indicating the detected width W2 of the transport-object 900 to the control value-setting unit 62b.

The control value-setting unit 62b sets a control value for determining a drive amount of the bumper driver 40 (that is, how much the bumper 30 needs to be extended). The control value-setting unit 62b adjusts (changes) the drive amount of the bumper driver 40 on the basis of the width W2 of the transport-object 900 detected by the information processor 62a. For example, the control value-setting unit 62b adjusts the drive amount of the bumper driver 40 such that a width W3 of the bumper 30 after having extended (see FIG. 3) is substantially the same as the width W2 of the transport-object 900 in the Y direction, or the width W3 of the bumper 30 is slightly larger than the width W2 of the transport-object 900 in the Y direction. Thereby, the controller 60 determines the drive amount of the bumper driver 40 according to the width W2 of the transport-object 900. The control value-setting unit 62b outputs the set control value to the control value-output unit 62c.

The control value-output unit 62c outputs the control value set by the control value-setting unit 62b to the bumper driver 40. As a result, the bumper driver 40 moves at least a portion of the bumper 30 on the basis of the control value set by the control value-setting unit 62b to extend the bumper 30.

Figure 5:
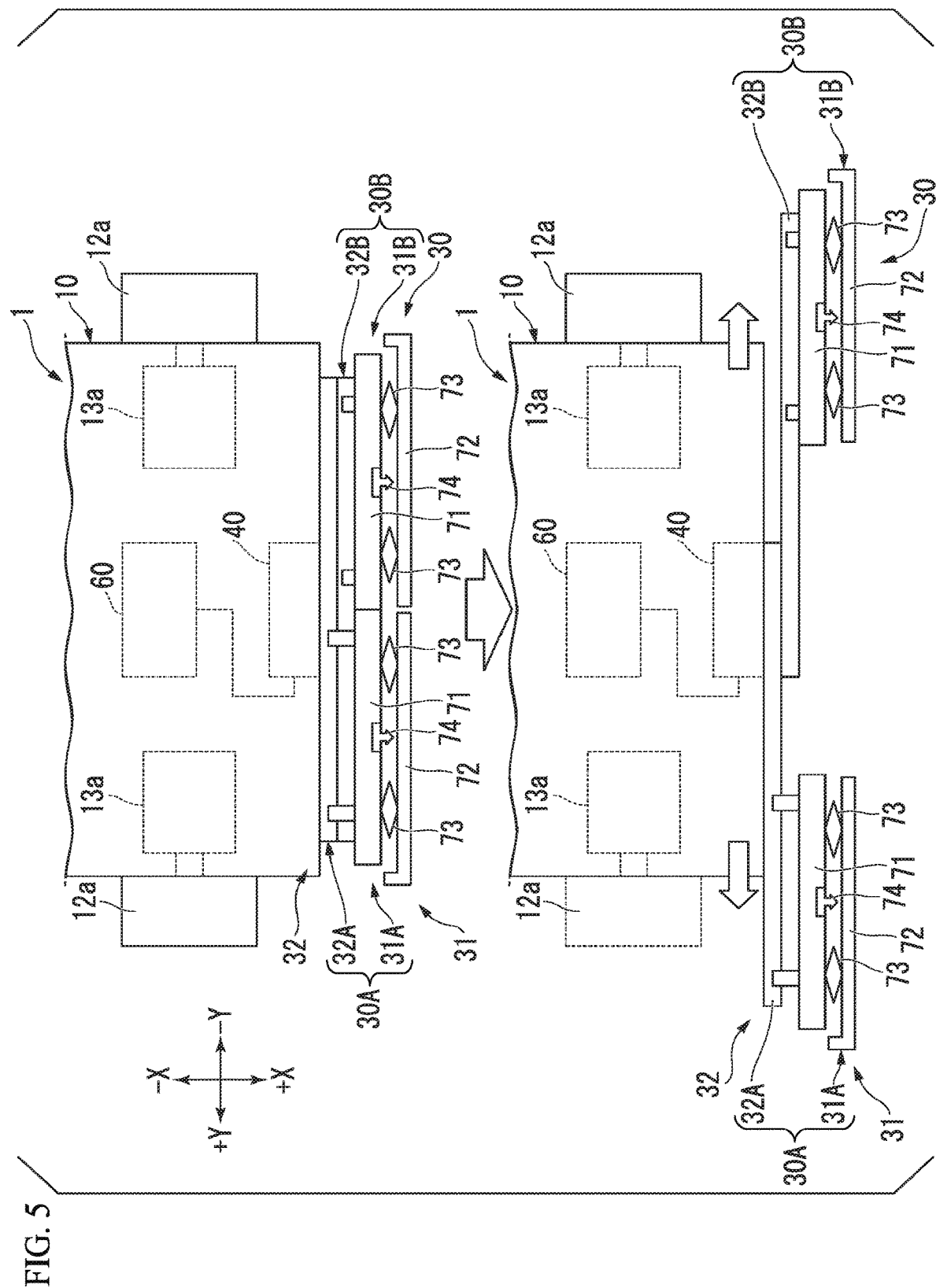
FIG. 5 is a plan view showing a front portion of the unmanned transport vehicle of the first embodiment.

Next, an example of the bumper 30 will be described. FIG. 5 is a plan view showing a front portion of the unmanned transport vehicle 1. An upper part in FIG. 5 shows the contracted state of the bumper 30. A lower part in FIG. 5 shows the extended state of the bumper 30. In this embodiment, the bumper 30 includes a first bumper portion 30A and a second bumper portion 30B. The first bumper portion 30A is movable along the Y direction. The second bumper portion 30B is movable along the Y direction in a direction opposite to the moving direction of the first bumper portion 30A.

More specifically, in this embodiment, the bumper support 32 of the bumper 30 includes a first bumper support 32A and a second bumper support 32B. The first bumper support 32A and the second bumper support 32B are each supported by the vehicle body 10 (for example, the vehicle body case 11). The first bumper support 32A is movable in the +Y direction from a position in the contracted state of the bumper 30 and is movable in the −Y direction from a position in the extended state of the bumper 30. On the other hand, the second bumper support 32B is movable in the −Y direction from a position in the contracted state of the bumper 30, and is movable in the +Y direction from a position in the extended state of the bumper 30.

In this embodiment, the bumper structure 31 includes a first bumper structure 31A and a second bumper structure 31B. In this embodiment, the first bumper structure 31A and the first bumper support 32A form the first bumper portion 30A. On the other hand, the second bumper structure 31B and the second bumper support 32B form the second bumper portion 30B.

Each of the first bumper structure 31A and the second bumper structure 31B includes a base 71, a collision-receiving portion 72, a support 73, and a collision detection sensor 74.

The base 71 of the first bumper structure 31A is fixed to the first bumper support 32A. Therefore, in a case where the first bumper support 32A moves in the Y direction, the first bumper structure 31A moves in the Y direction accompanying the movement of the first bumper support 32A. On the other hand, the base 71 of the second bumper structure 31B is fixed to the second bumper support 32B. Therefore, in a case where the second bumper support 32B moves in the Y direction, the second bumper structure 31B moves in the Y direction accompanying the movement of the second bumper support 32B. The base 71 may be omitted. In this case, the collision detection sensor 74 and the support 73 may be directly fixed to the first bumper support 32A or the second bumper support 32B.

The collision-receiving portion 72 is disposed on the +X direction side of the collision detection sensor 74. That is, the collision-receiving portion 72 is positioned on a side opposite to the vehicle body 10 with respect to the collision detection sensor 74. The collision-receiving portion 72 is an impact absorbing member formed of, for example, an elastic material such as rubber or sponge, and alleviates impact of an external force applied when coming into contact with an obstacle. However, the collision-receiving portion 72 may be formed of a metal or the like and transfer the impact directly to the support 73.

The support 73 is disposed between the base 71 and the collision-receiving portion 72. The support 73 maintains a gap between the collision-receiving portion 72 and the collision detection sensor 74 in a state in which no external force acts on the collision-receiving portion 72. On the other hand, when an external force acts on the collision-receiving portion 72, the support 73 is deformed to allow the collision-receiving portion 72 to move in the −X direction. The support 73 is, for example, a link mechanism connected to both the base 71 and the collision-receiving portion 72. However, the support 73 is not limited to the above example, and a mechanism using rubber or a spring may be used.

The collision detection sensor 74 is attached to the base 71, for example. The collision detection sensor 74 may be a mechanical limit switch or an electrical pressure-sensitive sensor. The collision detection sensor 74 comes into contact with the collision-receiving portion 72 when an external force acts on the collision-receiving portion 72. Thereby, the collision detection sensor 74 detects that an input state has changed and the bumper 30 has come into contact with an obstacle. The collision detection sensor 74 may be attached to a rear surface (a surface on the −X direction side) of the collision-receiving portion 72, instead of being attached to the base 71.

Figure 6:
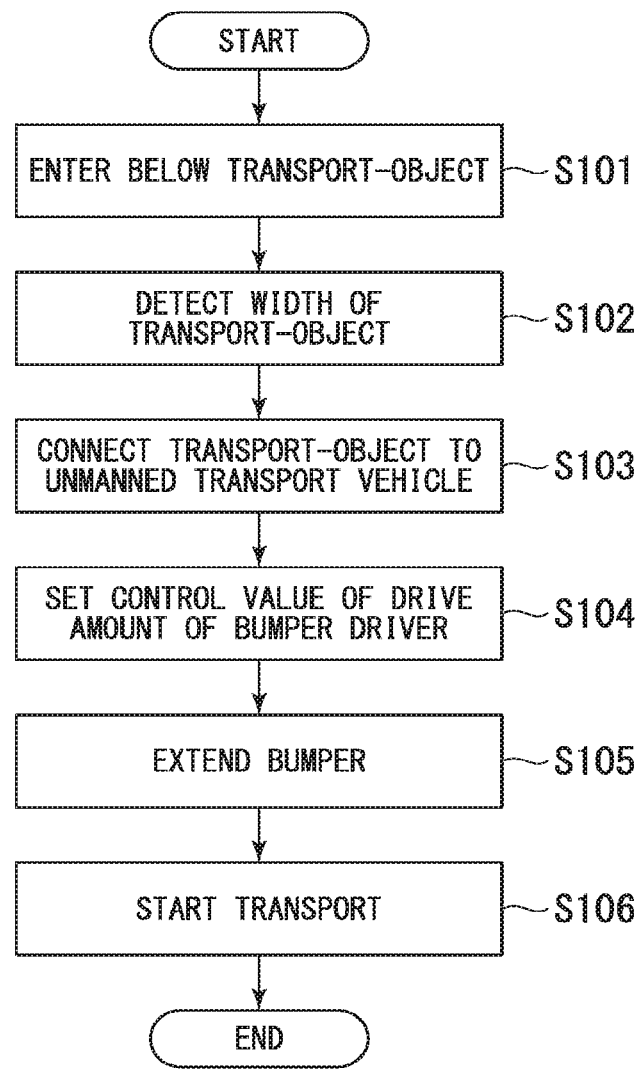
FIG. 6 is a flowchart showing an example of a flow of processing of the unmanned transport vehicle of the first embodiment.

Next, an example of a flow of processing performed by the unmanned transport vehicle 1 of this embodiment will be described. FIG. 6 is a flowchart showing an example of a flow of processing performed by the unmanned transport vehicle 1. First, the controller 60 controls the movement controller 61 such that the unmanned transport vehicle 1 moves toward below the loading portion 910 of the transport-object 900 (for example, toward a space between two casters 920 of the transport-object 900) (S101). At this time, the bumper 30 is in the contracted state. Further, at this time, the controller 60 detects the width W2 of the transport-object 900 on the basis of information acquired by the rear monitor 50 (S102).

In a case where the unmanned transport vehicle 1 has reached a predetermined position below the loading portion 910 of the transport-object 900, the controller 60 drives the connector 20 using a driver (not shown) so that the unmanned transport vehicle 1 and the transport-object 900 are connected (S103). Further, the controller 60 sets a control value of a drive amount of the bumper driver 40 on the basis of the detected width W2 of the transport-object 900 (S104). Then, the controller 60 extends the bumper 30 in the Y direction on the basis of the set control value (S105). Then, after extending the bumper 30, the unmanned transport vehicle 1 starts transport of the transport-object 900 (S106). Further, the processing of S104 and S105 may be performed in parallel with the processing of S103, or may be performed before the processing of S103.

According to the configuration described above, obstacle detection capability of the unmanned transport vehicle 1 can be enhanced. As a comparative example, an unmanned transport vehicle having a bumper that is within into a size of the vehicle body 10 may be considered. According to such an unmanned transport vehicle, collision detection of an obstacle with respect to the unmanned transport vehicle can be performed. However, in a state in which the unmanned transport vehicle 1 transports the transport-object 900, in a case where the width W2 of the transport-object 900 is larger than the width W1 of the unmanned transport vehicle 1, the transport-object 900 protrudes to the left and right of the unmanned transport vehicle 1 (the +Y direction side and the −Y direction side), and thus even when an obstacle collides with the transport-object 900, the obstacle cannot be detected by the collision detection sensor 74 in some cases.

On the other hand, in this embodiment, the unmanned transport vehicle 1 includes the bumper 30 having the collision detection sensor and extendable and contractible in the vehicle width direction, and the bumper driver 40 extending and contracting the bumper 30 in the vehicle width direction. According to such a configuration, by extending the bumper 30 in the vehicle width direction, the bumper 30 can be disposed in a larger region in front of the transport-object 900. Thereby, obstacle detection capability of the unmanned transport vehicle 1 can be enhanced. Further, according to such a configuration, in a case where the unmanned transport vehicle 1 moves alone, a large margin can be obtained at the time of passing by an obstacle or another unmanned transport vehicle by contracting the bumper 30. Also, since a standby space at the time of charging or the like is reduced, an efficient operation is possible.

A method of performing area monitoring of one plane at a certain height from to floor face using an LRF or the like and stopping movement in a case where an object is detected in the area can also be considered, but here it is difficult to detect an object made of glass or acrylic material that transmits laser light, or an object at a height lower than that of a laser scanning plane. Therefore, in a case where the bumper 30 is provided as a safety device, better obstacle detection capability can be realized.

In this embodiment, the rear monitor 50 acquires information relating to the width W2 of the transport-object 900. Then, the controller 60 determines the drive amount of the bumper driver 40 on the basis of the information acquired by the rear monitor 50. According to such a configuration, it is possible to change an extension amount of the bumper 30 according to a shape or size of the transport-object 900. Thereby, it is possible to dispose the bumper 30 in a larger region (for example, the entire region) in front of the transport-object 900 and suppress excessive protrusion of the bumper 30 to the left and right of the transport-object 900. Thereby, ease of movement of the unmanned transport vehicle 1 can be enhanced.

Next, several modified examples of the first embodiment will be described.

Configurations other than those described below in each modified example are the same as those in the first embodiment.

First Modified Example

Figure 7:
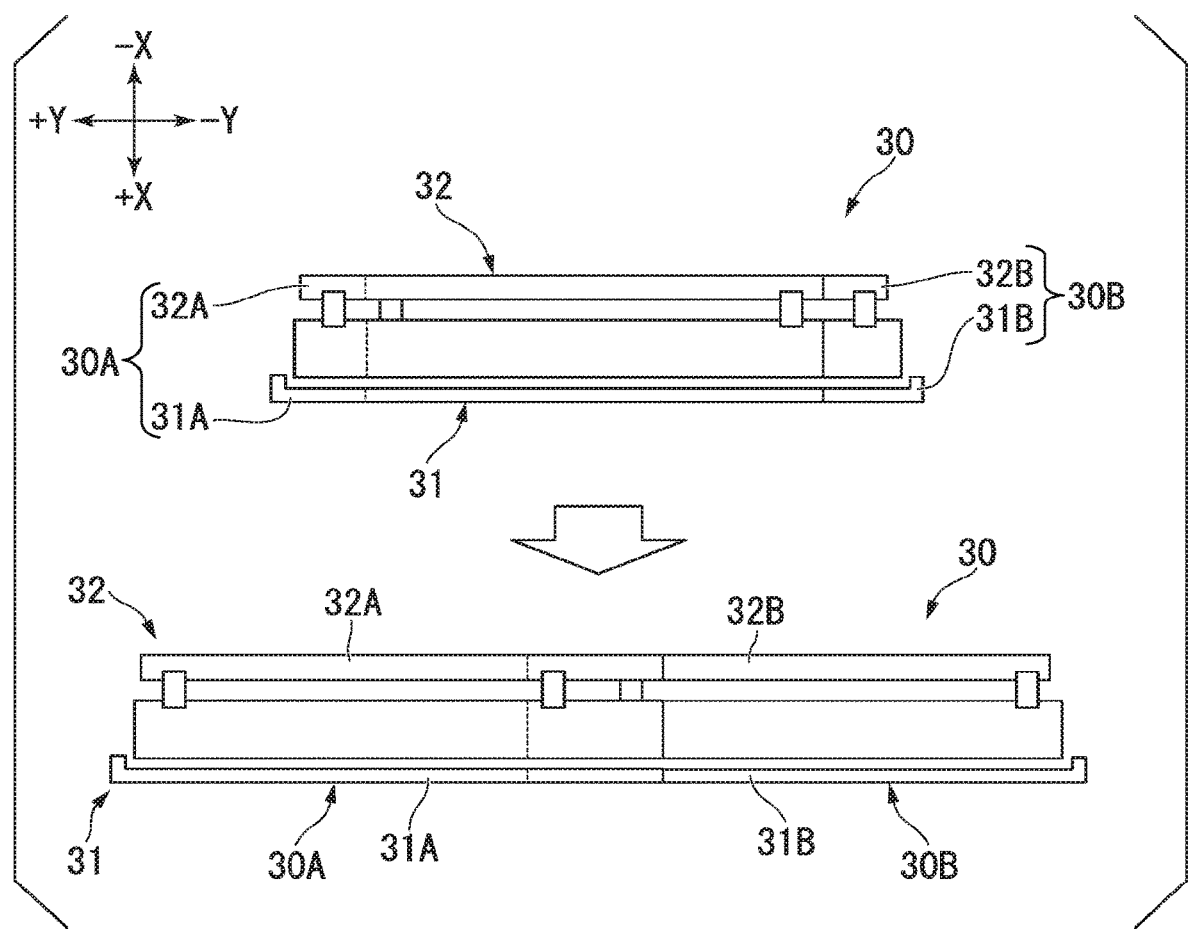
FIG. 7 is a plan view showing a change of a form of a bumper of a first modified example of the first embodiment.
Figure 8:
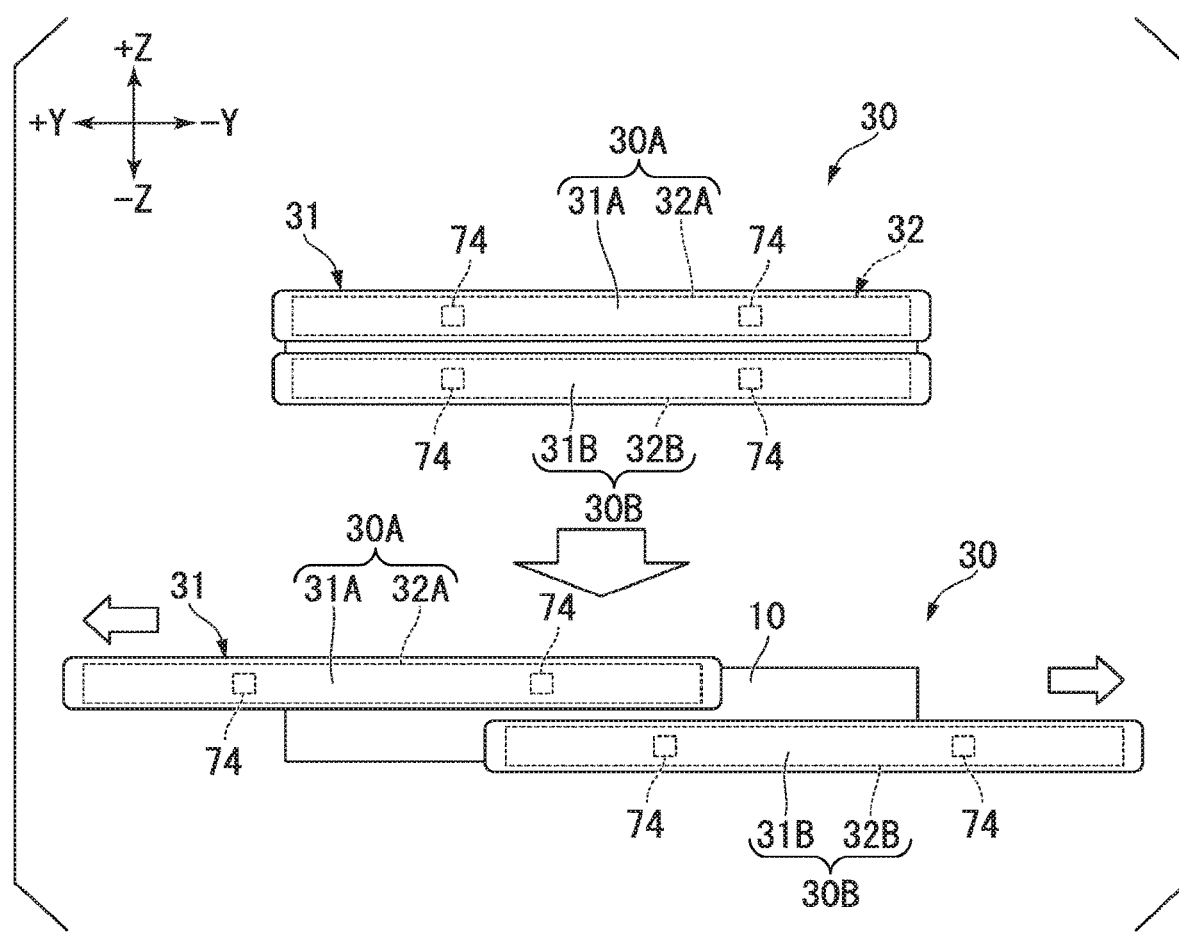
FIG. 8 is a front view showing the change of the form of the bumper of the first modified example of the first embodiment.

FIG. 7 is a plan view showing a change of a form of the bumper 30 of the unmanned transport vehicle 1 of a first modified example. FIG. 8 is a front view showing the change of the form of the bumper 30 of the unmanned transport vehicle 1 of the first modified example. Upper parts in FIGS. 7 and 8 show the contracted state of the bumper 30. Lower parts in FIGS. 7 and 8 show the extended state of the bumper 30. In FIGS. 7 and 8, illustration of the support 73 is omitted.

In this modified example, the first bumper structure 31A and the second bumper structure 31B are disposed at different heights. The first bumper structure 31A and the second bumper structure 31B are disposed at substantially the same positions in relation to the Y direction in a contracted state of the bumper 30. In the extended state of the bumper 30, the first bumper structure 31A and the second bumper structure 31B respectively move in the +Y direction or the −Y direction, and partially overlap each other in the Z direction. Therefore, even in the extended state of the bumper 30, at least one of the first bumper structure 31A and the second bumper structure 31B is present over the entire region of the bumper 30 in the Y direction. As a result, even in the extended state of the bumper 30, collision detection can be performed over the entire region of the bumper 30.

Second Modified Example

Figure 9:
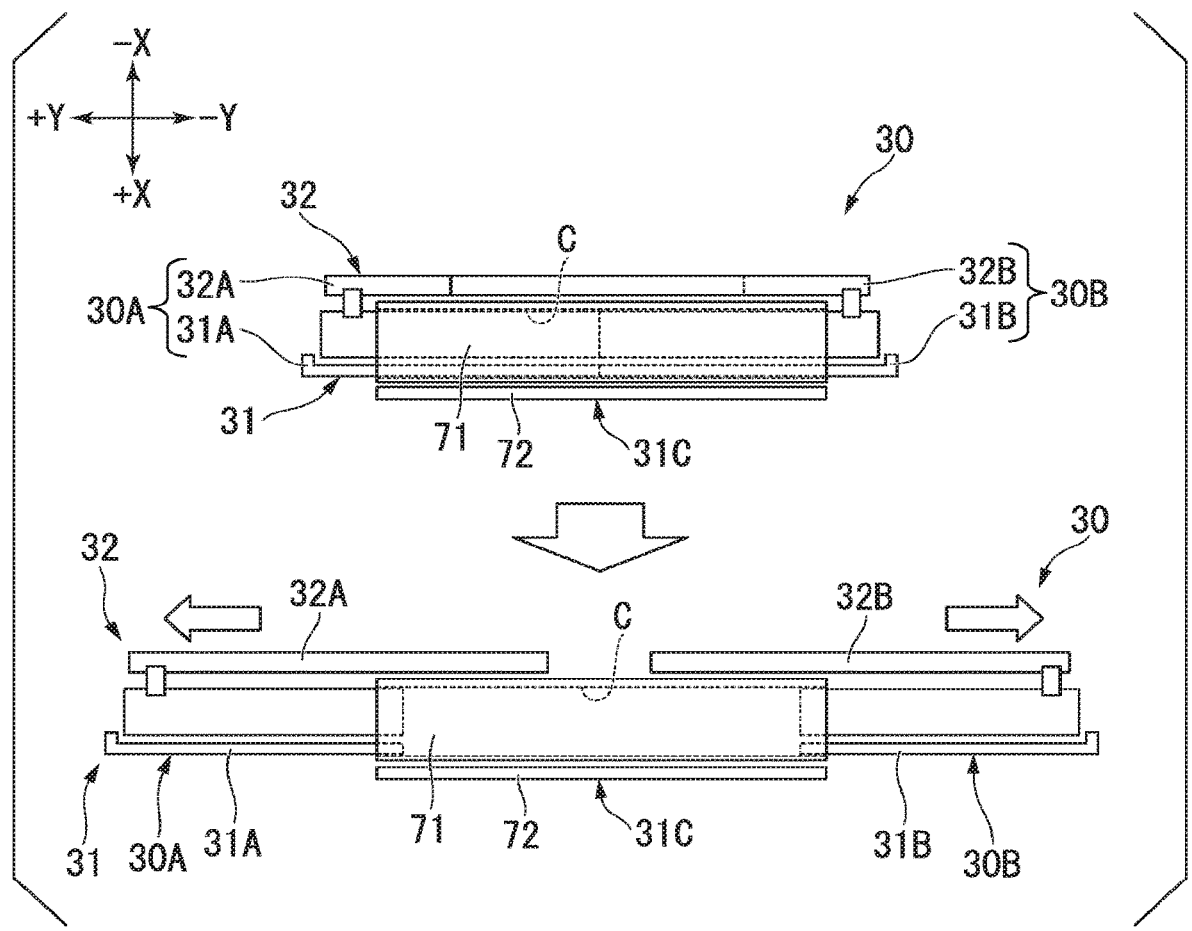
FIG. 9 is a plan view showing a change of a form of a bumper of a second modified example of the first embodiment.
Figure 10:
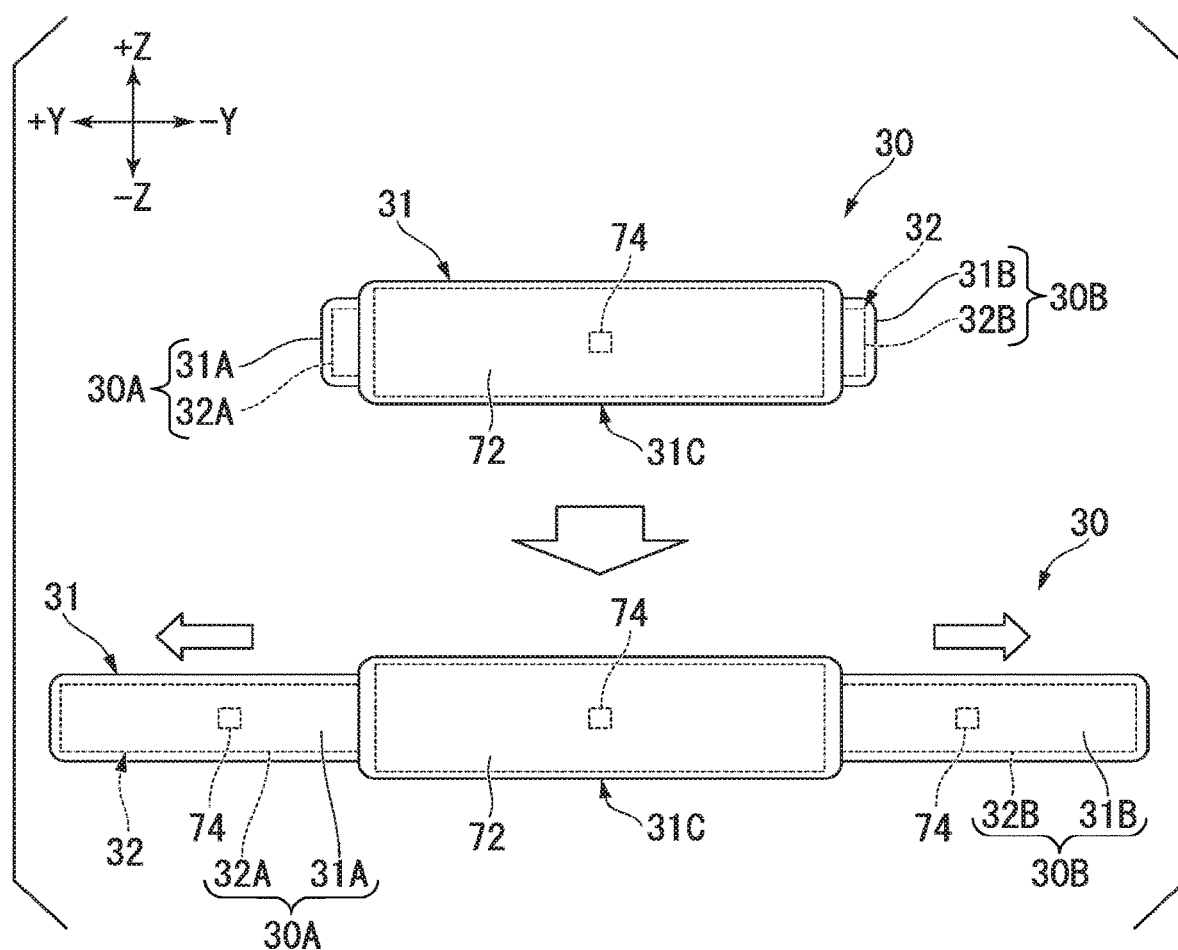
FIG. 10 is a front view showing the change of the form of the bumper of the second modified example of the first embodiment.

FIG. 9 is a plan view showing a change of a form of the bumper 30 of the unmanned transport vehicle 1 of a second modified example FIG. 10 is a front view showing the change of the form of the bumper 30 of the unmanned transport vehicle 1 of the second modified example. Upper parts in FIGS. 9 and 10 show the contracted state of the bumper 30. Lower parts in FIGS. 9 and 10 show the extended state of the bumper 30. In FIGS. 9 and 10, illustration of the support 73 is omitted.

In this modified example, the bumper 30 includes a third bumper structure 31C in addition to the first bumper structure 31A and the second bumper structure 31B. The third bumper structure 31C is not fixed to the first bumper support 32A and the second bumper support 32B but fixed to the vehicle body 10 and a position thereof in relation to the Y direction is fixed. As in the first bumper structure 31A and the second bumper structure 31B, the third bumper structure 31C includes a base 71, a collision-receiving portion 72, a support 73, and a collision detection sensor 74. However, an accommodating portion C capable of accommodating at least a portion of the first bumper structure 31A and at least a portion of the second bumper structure 31B is provided inside the base 71 of the third bumper structure 31C. At least a portion of the first bumper structure 31A and at least a portion of the second bumper structure 31B are accommodated in the accommodating portion C of the third bumper structure 31C in the contracted state of the bumper 30. Then, when the first bumper structure 31A and the second bumper structure 31B move in the +Y direction or the −Y direction from the accommodating portion C of the third bumper structure 31C, the bumper 30 is brought into the extended state. In this modified example, also in the extended state of the bumper 30, at least any one of the first bumper structure 31A, the second bumper structure 31B, and the third bumper structure 31C is present over the entire region of the bumper 30 in the Y direction. As a result, even in the extended state of the bumper 30, collision detection can be performed over the entire region of the bumper 30.

Second Embodiment

Next, a second embodiment will be described with reference to FIG. 11. The second embodiment is different from the first embodiment in that an upper detector 81 and a lower detector 82 are provided at the bumper 30. Configurations other than those described below are the same as those in the first embodiment.

Figure 11:
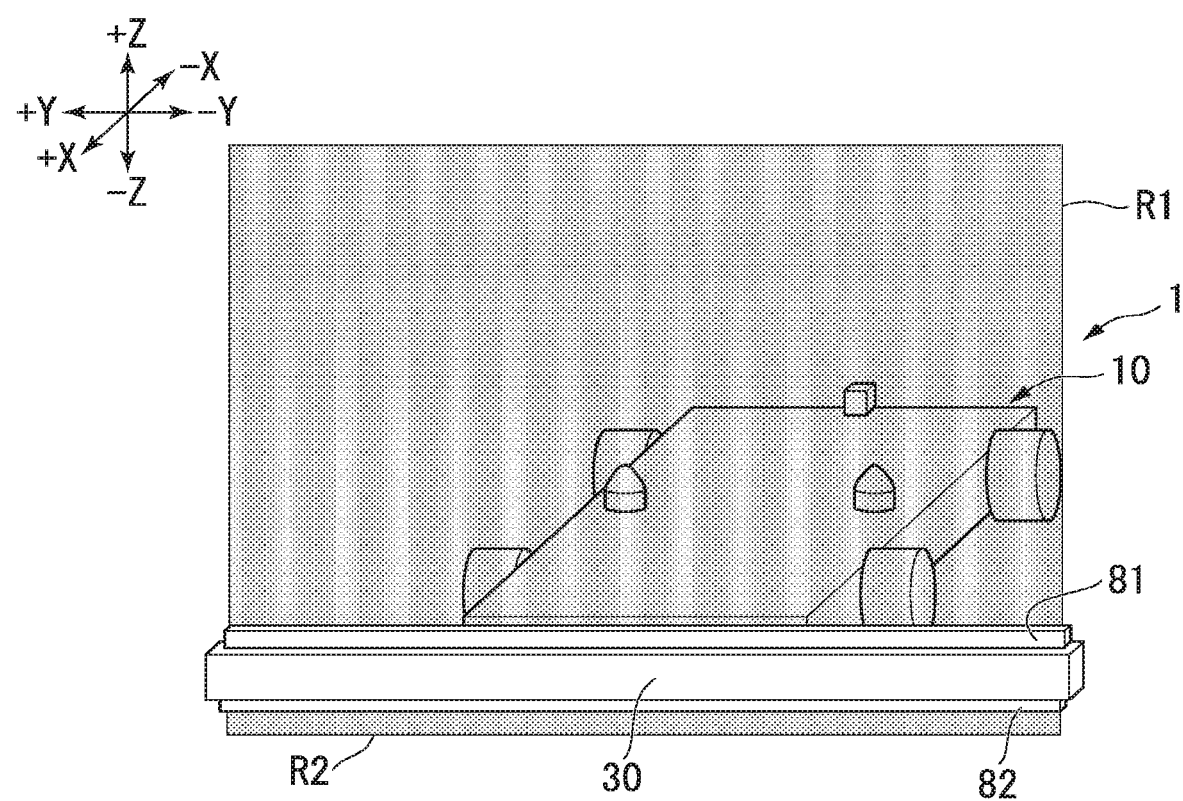
FIG. 11 is a perspective view showing an unmanned transport vehicle of a second embodiment.

FIG. 11 is a perspective view showing an unmanned transport vehicle 1 of the present embodiment. In this embodiment, the unmanned transport vehicle 1 includes the upper detector 81 and the lower detector 82. The upper detector 81 is provided at the bumper 30 and sets a detection region R1 along a plane intersecting a horizontal plane above the bumper 30 in front of a transport-object 900. In the specification, "provided at the bumper 30" includes both cases of being provided at a bumper structure 31 and being provided at a bumper support 32. This definition also applies to the lower detector 82 and distance sensors 91, 92, 100, 111, 112, 141, and 142 described below, and the like. The expression "intersecting a horizontal plane" means that substantially perpendicular to the horizontal plane or obliquely inclined thereto.

The upper detector 81 sets the detection region R1 called a light curtain above the bumper 30. The upper detector 81 includes, for example, a plurality of projectors provided at the bumper 30 for projecting light upward and a plurality of light receivers for detecting a reflection state of the light projected from the projectors. The upper detector 81 detects a change in the reflection state of the light in a case where an object enters the detection region R1. A controller 60 detects an object on the basis of a detection result of the upper detector 81. In a case where an object is detected on the basis of the detection result of the upper detector 81, the controller 60 operates in the same manner as the case in which the collision detection sensor 74 of the bumper 30 reacts. Further, the light projected from the projectors may be visible light or light in a non-visible light frequency region such as infrared light.

A portion of the upper detector 81 (for example, one or more respective light projectors and light receivers) is provided at the first bumper portion 30A and moves in the Y direction accompanying the first bumper portion 30A moving in the Y direction. Another portion of the upper detector 81 (for example, one or more respective light projectors and light receivers) is provided at the second bumper portion 30B and moves in the Y direction accompanying the second bumper portion 30B moving in the Y direction. Thereby, even in a case where the bumper 30 is in the extended state, the detection region R1 can be set above the entire region in the Y direction of the bumper 30. In other words, according to the present embodiment, even when a width W2 of the transport-object 900 is larger than a width W1 of the unmanned transport vehicle 1, the detection region R1 can be set in a large region (for example, the entire region) in front of the transport-object 900. The upper detector 81 may also be referred to as a "first front detector."

The lower detector 82 is provided at the bumper 30 and sets a detection region R2 along a plane intersecting a horizontal plane below the bumper 30 in front of the transport-object 900. The lower detector 82 sets the detection region R2 called a light curtain below the bumper 30. The lower detector 82 includes, for example, a plurality of projectors provided at the bumper 30 for projecting light downward and a plurality of light receivers for detecting a reflection state of the light projected from the projectors. The lower detector 82 detects a change in the reflection state of the light in a case where an object enters the detection region R2 or in a case where there is unevenness on a floor face on which the unmanned transport vehicle 1 moves. The controller 60 detects an object or unevenness on the basis of a detection result of the lower detector 82. In a case where an object or unevenness is detected on the basis of the detection result of the upper detector 81, the controller 60 operates in the same manner as the case in which the collision detection sensor 74 of the bumper 30 reacts. Further, the light projected from the projectors may be visible light or light in a non-visible light frequency region such as infrared light.

A portion of the lower detector 82 (for example, one or more respective light projectors and light receivers) is provided at the first bumper portion 30A and moves in the Y direction accompanying the first bumper portion 30A moving in the Y direction. Another portion of the lower detector 82 (for example, one or more respective light projectors and light receivers) is provided at the second bumper portion 30B and moves in the Y direction accompanying the second bumper portion 30B moving in the Y direction. Thereby, even in a case where the bumper 30 is in the extended state, the detection region R2 can be set below the entire region in the Y direction of the bumper 30. In other words, according to the present embodiment, even when the width W2 of the transport-object 900 is larger than the width W1 of the unmanned transport vehicle 1, the detection region R2 can be set in a large region (for example, the entire region) in front of the transport-object 900. The lower detector 82 may also be referred to as a "second front detector."

According to such a configuration, the detection regions R1 and R2 can be set above and below the bumper 30, and thus regions above and below the bumper 30 can be monitored with the same width as the width of the extended bumper 30. As a result, it is possible to monitor a further larger region in front of the transport-object 900 (for example, the entire region in a moving direction of the transport-object 900).

Third Embodiment

Next, a third embodiment will be described with reference to FIG. 12. The third embodiment is different from the first embodiment in that a first distance sensor 91 and a second distance sensor 92 are provided at the bumper 30. Configurations other than those described below are the same as those in the first embodiment.

Figure 12:
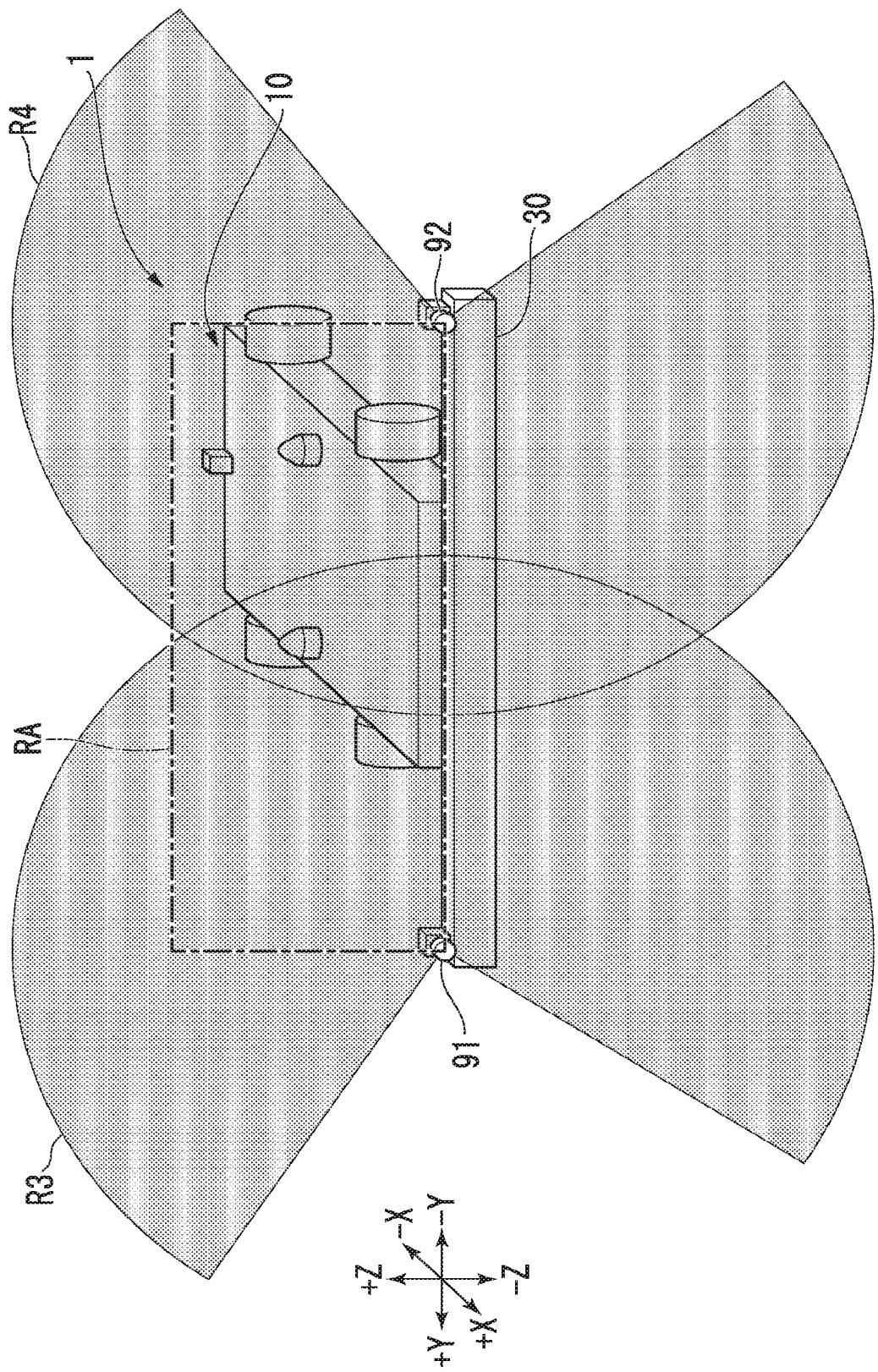
FIG. 12 is a perspective view showing an unmanned transport vehicle of a third embodiment.

FIG. 12 is a perspective view showing an unmanned transport vehicle 1 of the present embodiment. In this embodiment, the unmanned transport vehicle 1 includes the first distance sensor 91 and the second distance sensor 92. The term "distance sensor" means a sensor which detects a distance to an object. For example, the distance sensor evaluates and calculates light projected and reflected, converts the light into a distance to an object that caused the reflection, and outputs the distance. In this embodiment, each of the first distance sensor 91 and the second distance sensor 92 is a laser range finder (LRF) that performs laser scanning of one plane in a space. An LRF oscillates laser light, irradiates an object with the oscillated laser light, and detects a distance to the object with a degree of the reflected laser light. The first distance sensor 91 has an LRF detection region R3 in a predetermined angular range centered on the first distance sensor 91 as a laser scanning plane. Similarly, the second distance sensor 92 has an LRF detection region R4 in a predetermined angular range centered on the second distance sensor 92 as a laser scanning plane. In the present embodiment, the scanning planes of the first distance sensor 91 and the second distance sensor 92 (the LRF detection regions R3 and R4) are, for example, planes that intersect a horizontal plane in a Y direction (for example, substantially perpendicular to the horizontal plane).

In the present embodiment, the first distance sensor 91 is provided at an end portion on a +Y direction side of the bumper 30 and moves in the Y direction accompanying a first bumper portion 30A moving in the Y direction. On the other hand, the second distance sensor 92 is provided at an end portion on a −Y direction side of the bumper 30 and moves in the Y direction accompanying a second bumper portion 30B moving in the Y direction. In the present embodiment, among the LRF detection regions R3 and R4 of the first distance sensor 91 and the second distance sensor 92, a predetermined region set by a controller 60 is a detection region RA for detecting an object. The detection region RA is set above the entire region between the first distance sensor 91 and the second distance sensor 92. Thereby, even in the extended state of the bumper 30, the detection region RA can be set above the entire region of the bumper 30 in the Y direction. In other words, according to the present embodiment, even in a case where a width W2 of a transport-object 900 is larger than a width W1 of the unmanned transport vehicle 1, the detection region RA can be set in a large region (for example, the entire region) in front of the transport-object 900.

According to such a configuration, as in the second embodiment, it is possible to monitor a further larger region in front of the transport-object 900 (for example, the entire region in the moving direction of the transport-object 900). Further, although the example in which the detection region RA is set above the bumper 30 has been described in FIG. 12, a setting position of the detection region RA is not limited to the above example. The detection region RA may be provided below the bumper 30, in addition to or instead of above the bumper 30.

Fourth Embodiment

Figure 13:
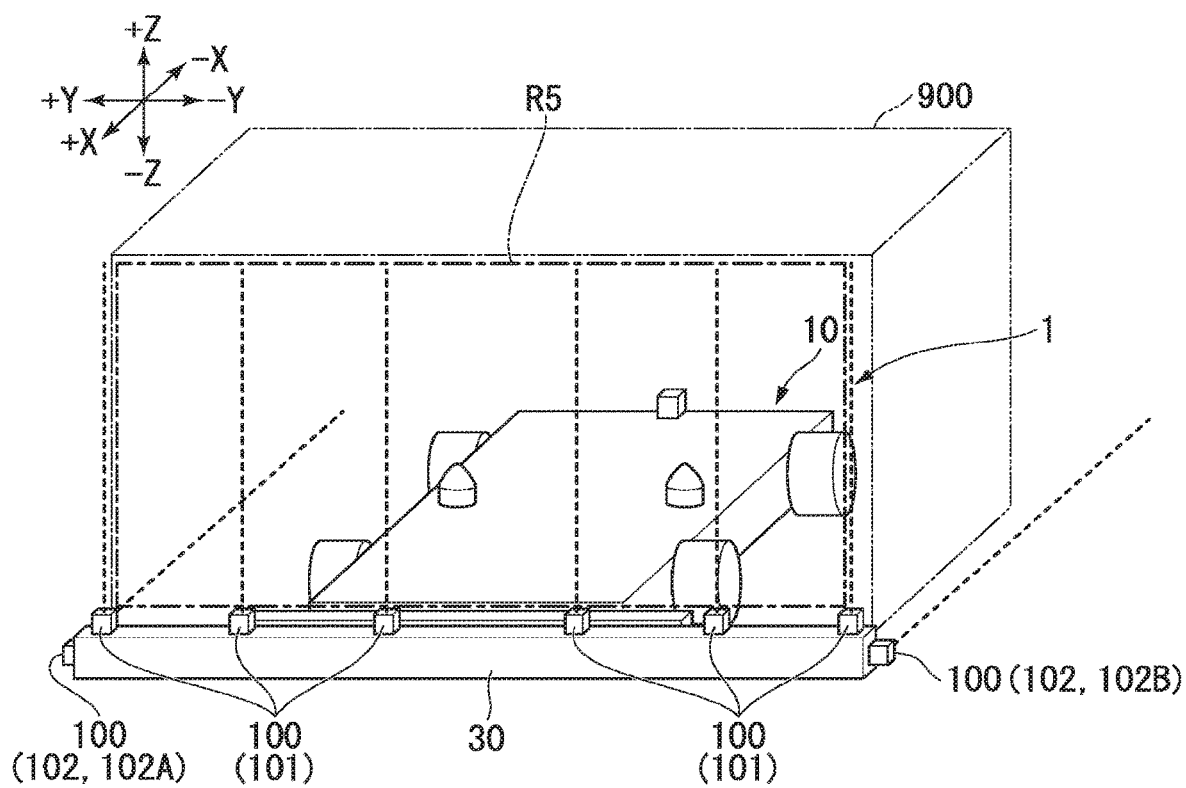
FIG. 13 is a perspective view showing an unmanned transport vehicle of a fourth embodiment.

Next, a fourth embodiment will be described with reference to FIG. 13. The fourth embodiment is different from the first embodiment in that a plurality of single-axis optical axis sensors 100 (hereinafter referred to as "optical axis sensor 100") are provided at a bumper 30. Configurations other than those described below are the same as those in the first embodiment. Further, in this embodiment, a rear monitor 50 may be omitted.

In the present embodiment, an unmanned transport vehicle 1 includes the plurality of optical axis sensors 100. The optical axis sensors 100 are optical sensors that measure in a single-axis direction in a space, evaluate and calculate light projected and reflected along a single axis, convert the light into a distance to an object that caused the reflection, and output the distance. Each of the optical axis sensors 100 is an example of a "distance sensor." Further, light projected from the optical axis sensors 100 may be visible light or light in a non-visible light frequency region such as infrared light. The plurality of optical axis sensors 100 include a plurality of upper optical axis sensors 101 and two lateral side optical axis sensors 102.

The plurality of upper optical axis sensors 101 are provided at the bumper 30 and arranged in a Y direction at predetermined intervals. The upper optical axis sensors 101 project light upward and detect reflected light thereof. One or more upper optical axis sensors 101 among the plurality of upper optical axis sensors 101 are provided at a first bumper portion 30A and move in the Y direction accompanying the first bumper portion 30A moving in the Y direction. One or more other upper optical axis sensors 101 among the plurality of upper optical axis sensors 101 are provided at a second bumper portion 30B and move in the Y direction accompanying the second bumper portion 30B moving in the Y direction. Thereby, in a case where the bumper 30 is in an extended state, the plurality of upper optical axis sensors 101 can set a detection region R5 larger than a width W1 of the unmanned transport vehicle 1 in front of a transport-object 900 as a detection region for detecting an obstacle or the like.

The two lateral side optical axis sensors 102 include a first lateral side optical axis sensor 102A and a second lateral side optical axis sensor 102B. The first lateral side optical axis sensor 102A and the second lateral side optical axis sensor 102B are examples of sensors at least capable of detecting objects arranged in the Y direction with respect to a vehicle body 10. The first lateral side optical axis sensor 102A is provided at a side end portion in a +Y direction of the first bumper portion 30A. The first lateral side optical axis sensor 102A projects light in a −X direction and detects reflected light thereof. In a case where the first bumper portion 30A moves in the Y direction, the first lateral side optical axis sensor 102A moves in the Y direction accompanying the movement of the first bumper portion 30A. In the present embodiment, a controller 60 moves the first bumper portion 30A in the +Y direction to a position at which light projected in the −X direction from the first lateral side optical axis sensor 102A is not blocked due to the transport-object 900. Further, since details of this control are the same as, for example, processing of "moving the first bumper portion 30A to a position at which an LRF detection region R6 of a first distance sensor 111 is not blocked due to the transport-object 900" to be described in a fifth embodiment, a detailed description thereof will be omitted here.

The second lateral side optical axis sensor 102B is provided at a side end portion in the −Y direction of the second bumper portion 30B. The second lateral side optical axis sensor 102B projects light in the −X direction and detects reflected light thereof. In a case where the second bumper portion 30B moves in the Y direction, the second lateral side optical axis sensor 102B moves in the Y direction accompanying the movement of the second bumper portion 30B. In the present embodiment, the controller 60 moves the second bumper portion 30B in the −Y direction to a position at which light projected in the −X direction from the second lateral side optical axis sensor 102B is not blocked due to the transport-object 900. Further, since details of this control are the same as, for example, processing of "moving the second bumper portion 30B to a position at which a detection region R7 of a second distance sensor 112 is not blocked due to the transport-object 900" to be described in the fifth embodiment, a detailed description thereof will be omitted here.

According to such a configuration, as in the second embodiment, it is possible to monitor a further larger region in front of the transport-object 900 (for example, the entire region in a moving direction of the transport-object 900). In addition, according to the present embodiment, it is also possible to monitor a lateral side of and a side behind the transport-object 900 by the first lateral side optical axis sensor 102A and the second lateral side optical axis sensor 102B. In the present embodiment, the bumper 30 is extended to a position at which light projected in the −X direction from the first lateral side optical axis sensor 102A and the second lateral side optical axis sensor 102B is not blocked due to the transport-object 900. As a result, even in a case where the width W2 of the transport-object 900 is larger than the width W1 of the unmanned transport vehicle 1, a state of the lateral side of and the side behind the transport-object 900 can be detected without disturbance due to the transport-object 900.

Fifth Embodiment

Next, a fifth embodiment will be described with reference to FIG. 14. The fifth embodiment is different from the first embodiment in that a first distance sensor 111 and a second distance sensor 112 are provided at a bumper 30. Configurations other than those described below are the same as those in the first embodiment. Further, in this embodiment, a rear monitor 50 may be omitted.

Figure 14:
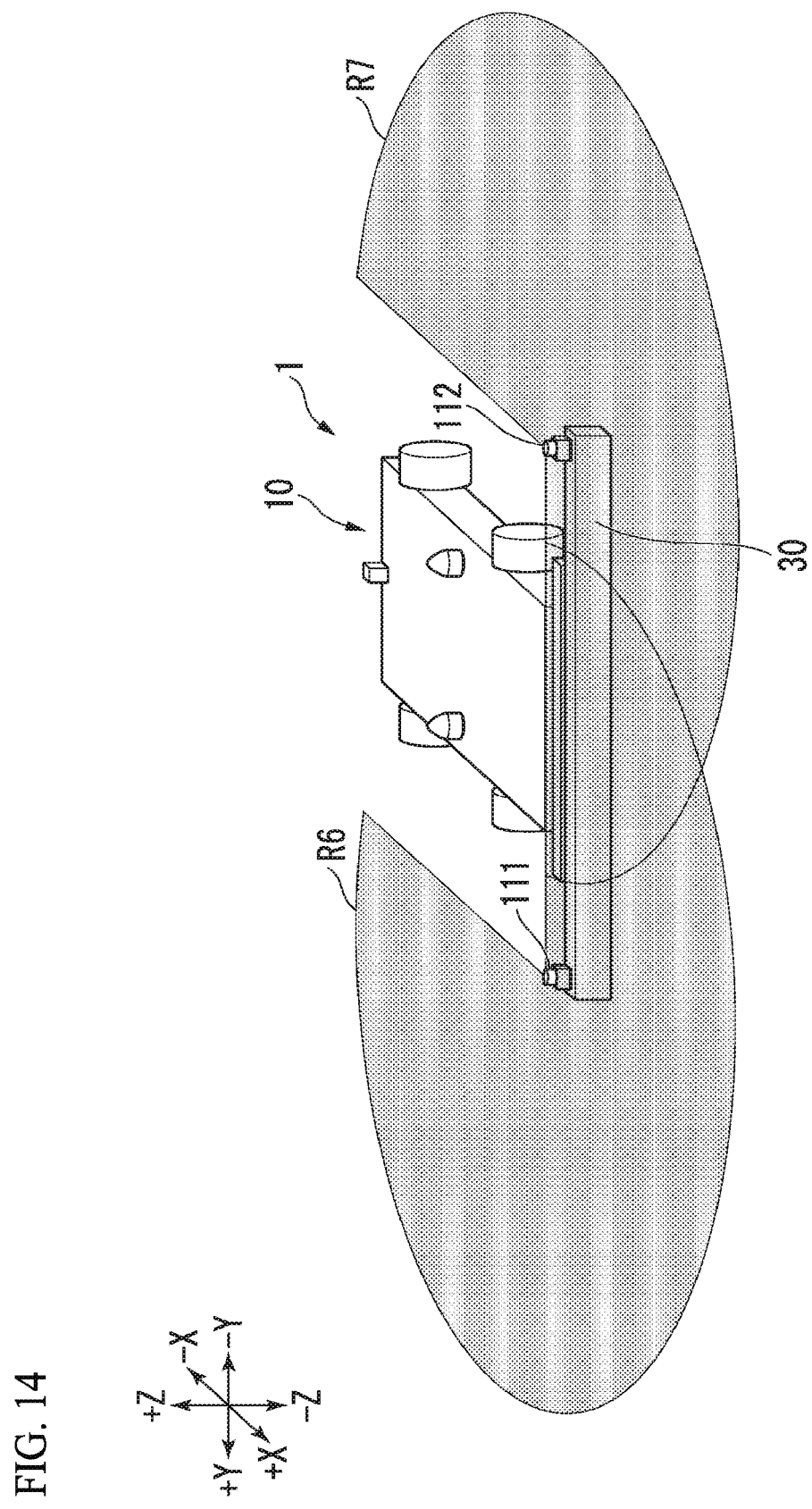
FIG. 14 is a perspective view showing an unmanned transport vehicle of a fifth embodiment.

FIG. 14 is a perspective view showing an unmanned transport vehicle 1 of the present embodiment. In the present embodiment, the unmanned transport vehicle 1 includes the first distance sensor 111 and the second distance sensor 112. Each of the first distance sensor 111 and the second distance sensor 112 is an LRF that performs laser scanning of one plane in a space. The first distance sensor 111 has an LRF detection region R6 in a predetermined angular range (for example, 270°) centered on the first distance sensor 111 as a laser scanning plane. Similarly, the second distance sensor 112 has an LRF detection region R7 in a predetermined angular range (for example, 270°) centered on the second distance sensor 112 as a laser scanning plane. In the present embodiment, each of the scanning planes (the LRF detection regions R6 and R7) of the first distance sensor 111 and the second distance sensor 112 is, for example, substantially parallel to a floor on which the unmanned transport vehicle 1 moves. The first distance sensor 111 and the second distance sensor 112 are examples of sensors at least capable of detecting an object arranged in the Y direction with respect to a vehicle body 10.

The LRF detection regions R6 and R7 are not limited to detection regions of the maximum capability ranges of the first distance sensor 111 and the second distance sensor 112, and may be a partial region set as a detection region by a controller 60 in the maximum capability range of the first distance sensor 111 and the second distance sensor 112 as the detection region RA described above. Since the unmanned transport vehicle 1 obtains information relating to obstacles in the surrounding space, for example, by the first distance sensor 111 and the second distance sensor 112 mounted thereon and an automatic travel control algorithm for avoiding collision with surrounding obstacles realized by the controller 60, the unmanned transport vehicle 1 is an autonomous moving truck capable of performing guideless movement.

In the present embodiment, the first distance sensor 111 is provided at an end portion on the +Y direction side of the bumper 30 (for example, an end portion on the +Y direction side of a first bumper portion 30A). The first distance sensor 111 can detect an object present on at least one of a lateral side of and a side behind the vehicle body 10 on the +Y direction side, and can measure a distance to the object. In a case where the first bumper portion 30A moves in the Y direction, the first distance sensor 111 moves in the Y direction accompanying the movement of the first bumper portion 30A. On the other hand, the second distance sensor 112 is provided at an end portion on the −Y direction side of the bumper 30 (for example, an end portion on the −Y direction side of a second bumper portion 30B). The second distance sensor 112 can detect an object present on at least one of a lateral side of and a side behind the vehicle body 10 on the −Y direction side, and can measure a distance to the object. In a case where the first bumper portion 30A moves in the Y direction, the second distance sensor 112 moves in the Y direction accompanying the movement of the second bumper portion 30B in the Y direction.

Figure 15:
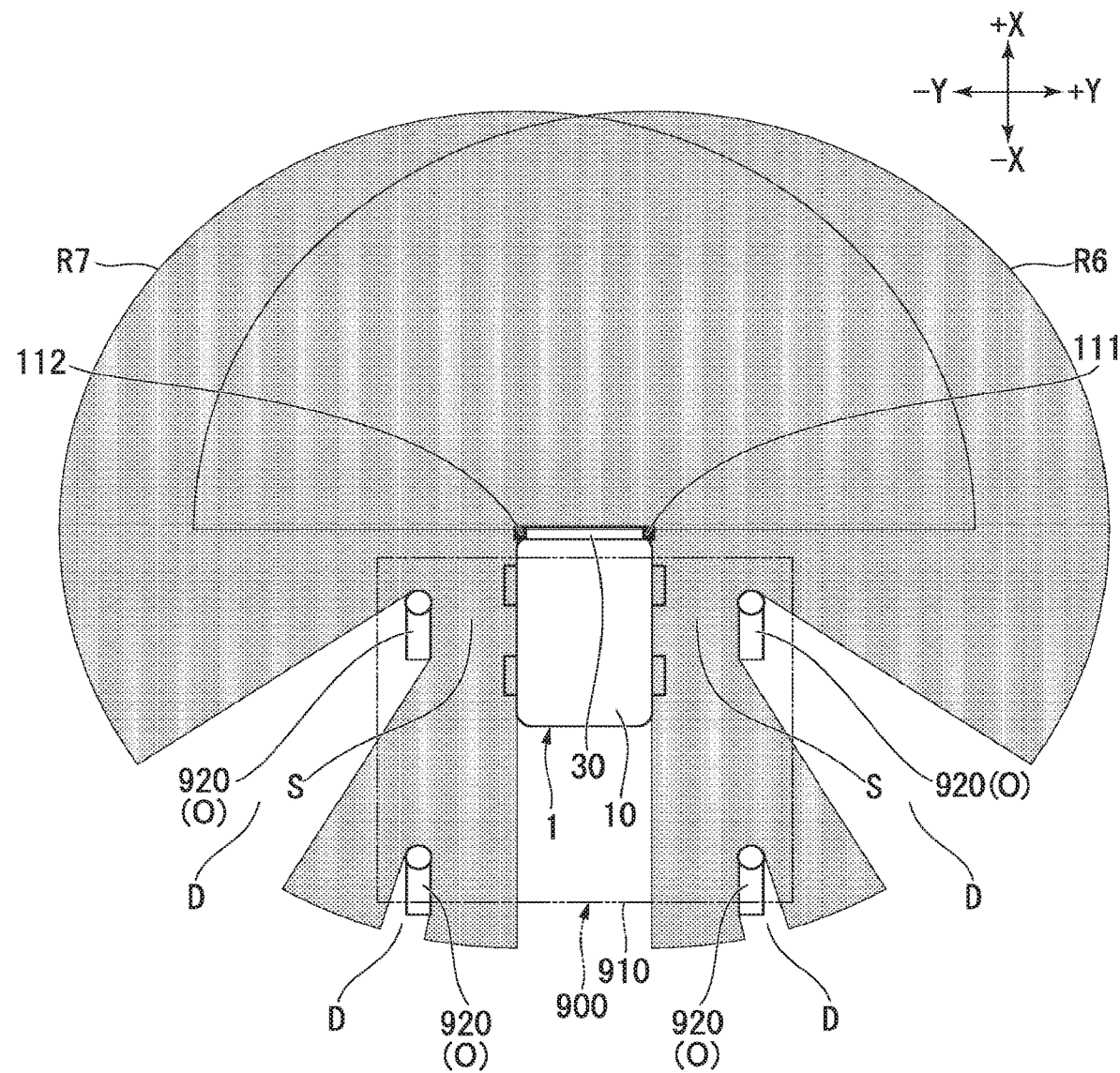
FIG. 15 is a plan view showing an example of LRF detection regions of a first distance sensor and a second distance sensor in a case where a bumper is in a contracted state in the fifth embodiment.

The LRF detection regions R6 and R7 of the first distance sensor 111 and the second distance sensor 112 in a case where the bumper 30 is in a contracted state will be described. FIG. 15 is a plan view showing an example of the LRF detection regions R6 and R7 of the first distance sensor 111 and the second distance sensor 112 in a case where the bumper 30 is in the contracted state. Further, FIG. 15 shows an example in which the first distance sensor 111 and the second distance sensor 112 are positioned within a height of casters 920 of a transport-object 900 in a Z direction. In this case, when viewed from the first distance sensor 111 and the second distance sensor 112, there are blind spot regions D on a side behind the casters 920 of the transport-object 900 which cannot be irradiated with a laser.

Figure 16:
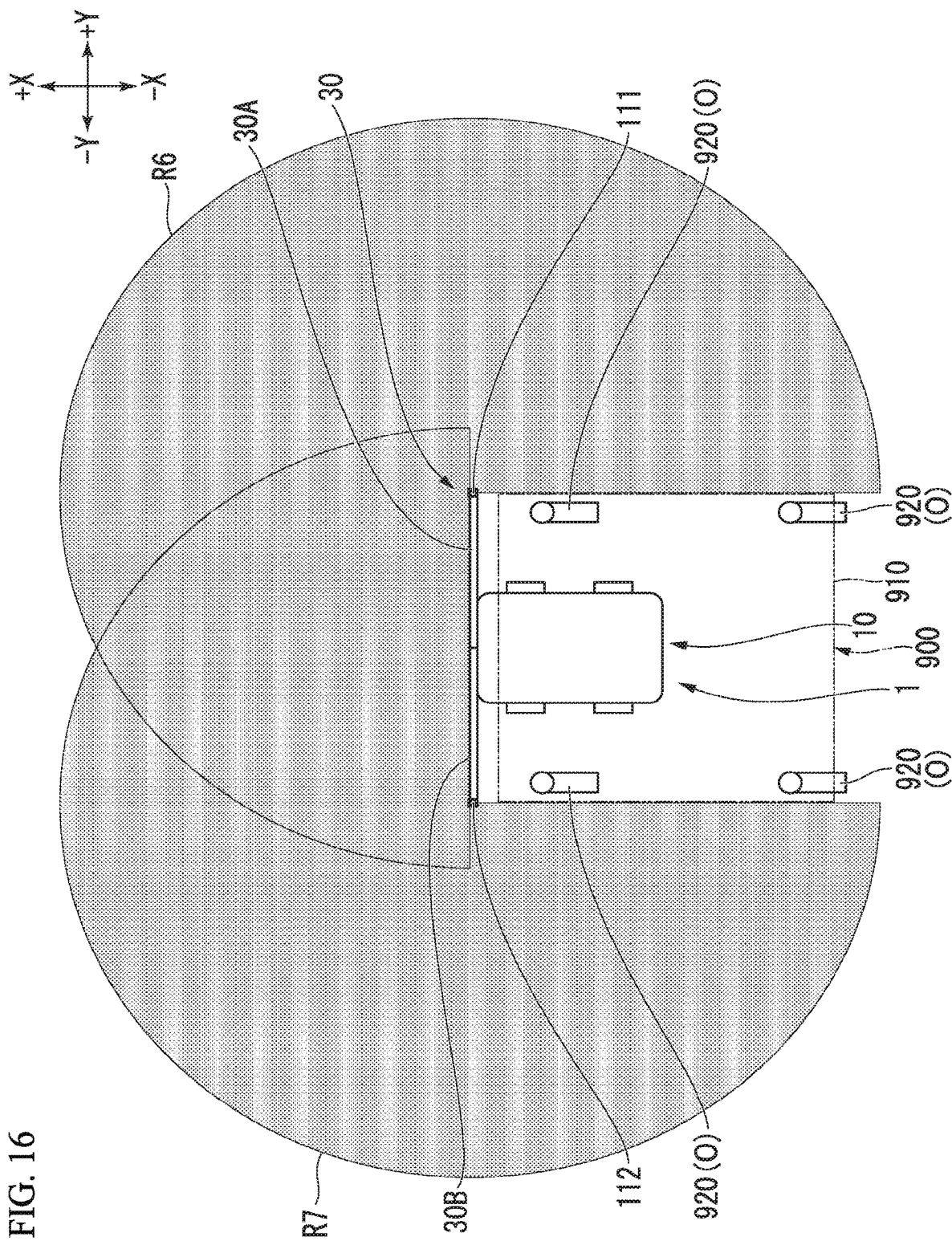
FIG. 16 is a plan view showing the unmanned transport vehicle in a state in which the bumper is extended in the fifth embodiment.

In the present embodiment, the controller 60 controls a bumper driver 40 and extends the bumper 30 such that blind spot regions D are eliminated. FIG. 16 is a plan view showing the unmanned transport vehicle 1 in a state in which the bumper 30 is extended. In this embodiment, in a case where a width W2 of the transport-object 900 is larger than a width W1 of the unmanned transport vehicle 1, the controller 60 moves the first bumper portion 30A and the second bumper portion 30B to positions at which the LRF detection regions R6 and R7 of the first distance sensor 111 and the second distance sensor 112 are not blocked due to the transport-object 900. For example, the controller 60 moves the first bumper portion 30A in the +Y direction so that the first distance sensor 111 is positioned on the +Y direction side with respect to a caster 920 positioned furthest toward the +Y direction side among the plurality of casters 920 of the transport-object 900 (or the first distance sensor 111 is positioned on the +Y direction side with respect to an edge end on the +Y direction side of the transport-object 900). Similarly, the controller 60 moves the second bumper portion 30B in the −Y direction so that the second distance sensor 112 is positioned on the −Y direction side with respect to a caster 920 positioned furthest toward the −Y direction side among the plurality of casters 920 of the transport-object 900 (or the second distance sensor 112 is positioned on the −Y direction side with respect to an edge end on the −Y direction side of the transport-object 900).

Figure 17:
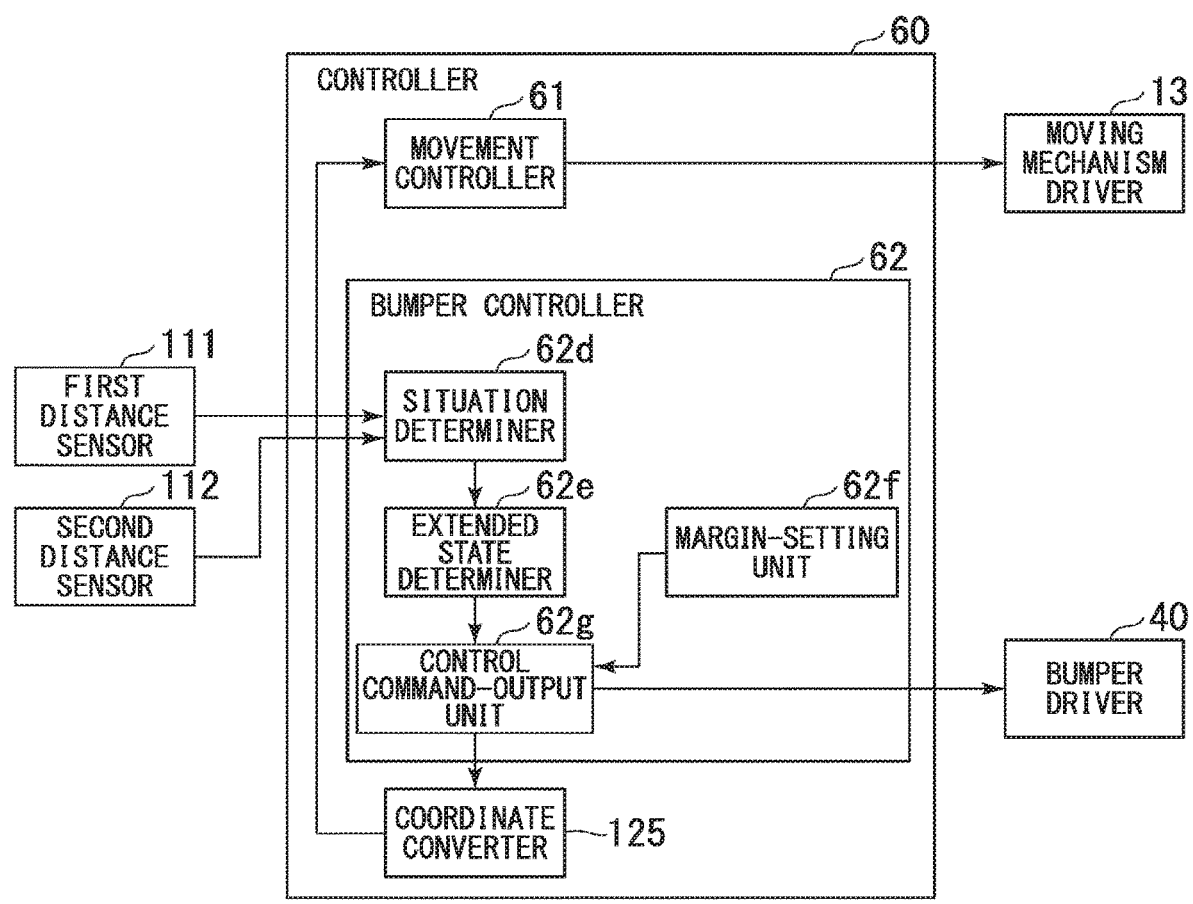
FIG. 17 is a block diagram showing a functional configuration of a controller of the fifth embodiment.

FIG. 17 is a block diagram showing a functional configuration of the controller 60 of the present embodiment. In the present embodiment, the bumper controller 62 includes a situation determiner 62d, an extended state determiner 62e, a margin-setting unit 62f, and a control command-output unit 62g. Since control of the first distance sensor 111 and control of the second distance sensor 112 are substantially the same, the control of the first distance sensor 111 will be described here. Description of the control relating to the second distance sensor 112 may be read, in the description of the control relating to the first distance sensor 111, by replacing the "first distance sensor 111" with the "second distance sensor 112," replacing the "first bumper portion 30A" with the "second bumper portion 30B," and replacing the "+Y direction" with the "−Y direction."

In a state in which the unmanned transport vehicle 1 has reached a position at which the unmanned transport vehicle 1 and the transport-object 900 are connected by a connector 20, the situation determiner 62d receives a detection result of the first distance sensor 111 from the first distance sensor 111. On the basis of the detection result of the first distance sensor 111, in a case where an object O is detected within a predetermined distance from the first distance sensor 111, the situation determiner 62d determines whether or not there is a space S (see FIG. 15) in the Y direction between the object O and the unmanned transport vehicle 1. In a case where it is recognized that there is a space S in the Y direction between the object O and the unmanned transport vehicle 1, the situation determiner 62d determines that the object O is one of the casters 920 of the transport-object 900. On the other hand, in a case where it is not recognized that there is a space S in the Y direction between the object O and the unmanned transport vehicle 1 (that is, in a case where the detected object O is continuous in the Y direction by a certain amount or more), since the first distance sensor 111 is positioned higher than the caster 920, the situation determiner 62d determines that a loading portion 910 of the transport-object 900 is detected by the first distance sensor 111.

The extended state determiner 62c receives detection results of the first distance sensor 111 at a predetermined sampling period in a state in which the first bumper portion 30A is moving in the +Y direction due to driving of the bumper driver 40. The extended state determiner 62e determines whether or not the object O continues to be present in the LRF detection region R6 of the first distance sensor 111. The extended state determiner 62e outputs determination results as to whether or not the object O continues to be present in the LRF detection region R6 of the first distance sensor 111 to the control command-output unit 62g.

In a case where the object O continues to be present in the LRF detection region R6 of the first distance sensor 111, on the basis of the determination result of the extended state determiner 62e, the control command-output unit 62g outputs a control command for moving the first bumper portion 30A further in the +Y direction to the bumper driver 40. On the other hand, in a case where the object O is no longer present in the LRF detection region R6 of the first distance sensor 111, on the basis of the determination results of the extended state determiner 62e, the control command-output unit 62g stops the output of the control command for moving the first bumper portion 30A. Further, in a case where a margin is set by the margin-setting unit 62f, the control command-output unit 62g may output a control command for moving the first bumper portion 30A further in the +Y direction by a distance corresponding to the set margin from the state in which the object O is no longer present in the LRF detection region R6 of the first distance sensor 111 to the bumper driver 40.

The margin-setting unit 62f sets an amount of the margin to be larger than zero in a predetermined case. The term "predetermined case" is, for example, a case in which the first distance sensor 111 and the second distance sensor 112 are positioned within the height of the caster 920 of the transport-object 900 in the Z direction. In this case, a substantially the same distance as a distance between the caster 920 on the +Y direction side (for example, a rotation axis in the Z direction of the caster 920 on the +Y direction side) and an edge in the +Y direction of the transport-object 900 is set as the margin. For example, in a case where a type of the transport-object 900 is known beforehand, this distance can be obtained by previously measuring the transport-object 900, and, in a case where there is the rear monitor 50, the distance can be obtained on the basis of information (for example, an image obtained by capturing the transport-object 900) acquired by the rear monitor 50. Further, in a case where these pieces of information cannot be obtained, the margin may be set to a predetermined value registered in advance.

Further, in the present embodiment, the controller 60 includes a coordinate converter 125. The coordinate converter 125 acquires information (for example, a control value indicating a drive amount) indicating a drive amount of the bumper driver 40 output from the control command-output unit 62g to the bumper driver 40. The drive amount of the bumper driver 40 corresponds to a displacement amount of the first distance sensor 111 and the second distance sensor 112. The coordinate converter 125 converts position information of an object detected by the first distance sensor 111 and the second distance sensor 112 into a coordinate system of the unmanned transport vehicle 1 on the basis of the drive amount of the bumper driver 40. A movement controller 61 controls a moving mechanism driver 13 on the basis of the position information of the object O converted into the coordinate system of the unmanned transport vehicle 1 by the coordinate converter 125.

Figure 18:
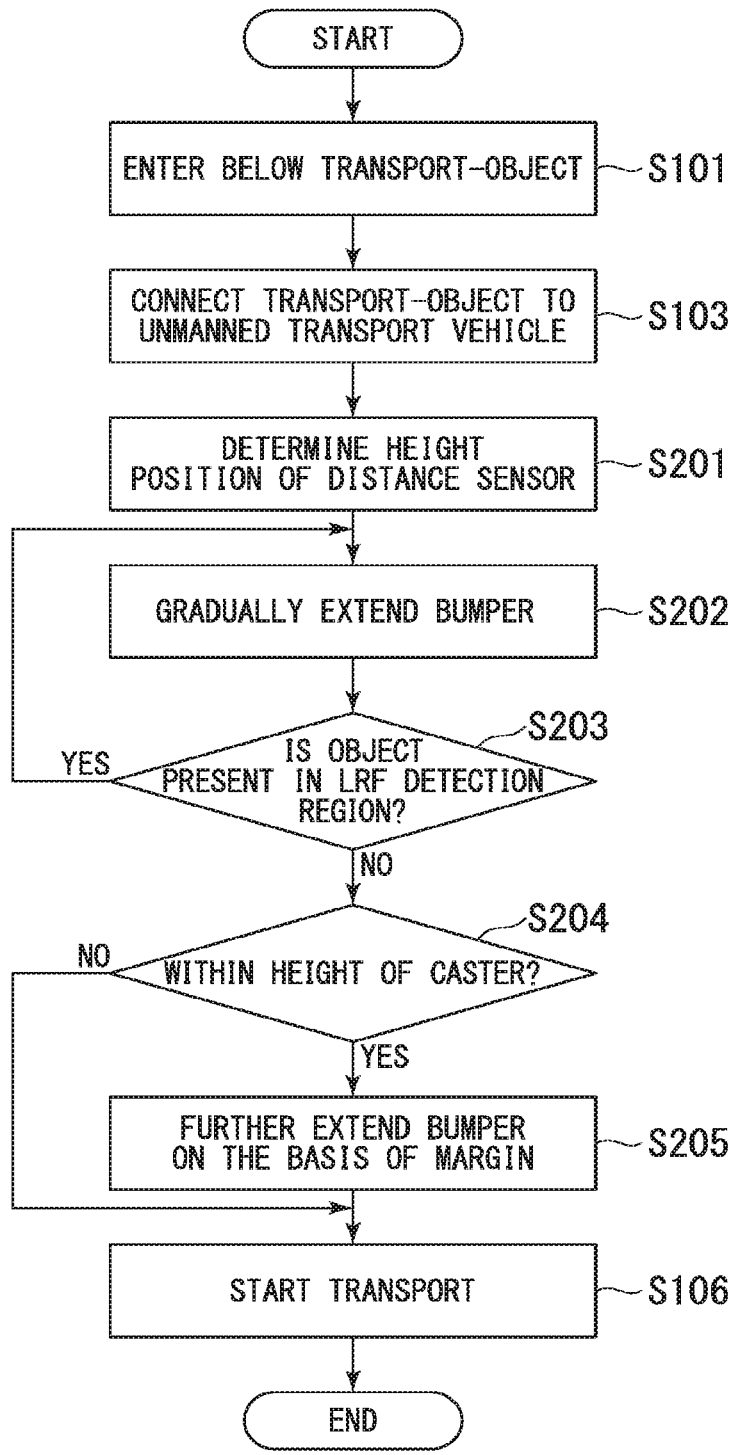
FIG. 18 is a flowchart showing an example of a flow of processing of the unmanned transport vehicle of the fifth embodiment.

Next, an example of a flow of processing performed by the unmanned transport vehicle 1 of the present embodiment will be described. FIG. 18 is a flowchart showing an example of a flow of processing performed by the unmanned transport vehicle 1. Since processing of S101, S103, and S106 is similar to the processing of S101, S103, and S106 of the first embodiment, a description thereof will be omitted.

In the present embodiment, the controller 60 determines whether or not the first distance sensor 111 and the second distance sensor 112 are within the height of the caster 920 (S201) on the basis of a detection result of the first distance sensor 111 and the second distance sensor 112. For example, in a case where there is the space S between the object O detected in the LRF detection regions R6 and R7 and the unmanned transport vehicle 1, the controller 60 determines that the object O is the caster 920 of the transport-object 900, and the first distance sensor 111 and the second distance sensor 112 are within the height of the caster 920 of the transport-object 900. On the other hand, in a case where there is no space S between the object O detected in the LRF detection regions R6 and R7 and the unmanned transport vehicle 1, the controller 60 determines that the object O is the loading portion 910 of the transport-object 900 and the first distance sensor 111 and the second distance sensor 112 are not within the height of the caster 920. This determination result is used in the processing of S205 to be described below.

Next, the controller 60 gradually extends the bumper 30 by driving the bumper driver 40 (S202) and determines whether or not the object O continues to be detected in the LRF detection regions R6 and R7 (S203). In a case where the object O continues to be detected in the LRF detection regions R6 and R7, the controller 60 returns to the processing of S202 and continues to output a control command to extend the bumper 30 to the bumper driver 40. That is, the controller 60 extends the bumper 30 until reaching a state in which the LRF detection regions R6 and R7 of the distance sensors 111 and 112 come out in the −X direction without being blocked by the transport-object 900. On the other hand, in a case where the object O is no longer detected in the LRF detection regions R6 and R7, the controller 60 proceeds to the processing of S204.

Next, the controller 60 refers to the determination result determined in S201 and determines (ascertains) whether or not the first distance sensor 111 and the second distance sensor 112 are within the height of the caster 920 of the transport-object 900 (S204). In a case where the first distance sensor 111 and the second distance sensor 112 are within the height of the caster 920 of the transport-object 900, the controller 60 extends the bumper 30 by a predetermined amount on the basis of the margin set by the margin-setting unit 62f (S205). On the other hand, in a case where the first distance sensor 111 and the second distance sensor 112 are not within the height of the caster 920 of the transport-object 900, the controller 60 does not perform the processing of S205. Then, the unmanned transport vehicle 1 starts transport of the transport-object 900 (S106). The processing of S201 and S205 may be performed in parallel with the processing of S103 or may be performed before the processing of S103.

According to such a configuration, obstacle detection capability of the unmanned transport vehicle 1 can be enhanced. As a comparative example, an unmanned transport vehicle having an LRF provided at a front end portion of the unmanned transport vehicle 1 is considered. According to such an unmanned transport vehicle, although the front side of the unmanned transport vehicle 1 and the transport-object 900 can be monitored, the transport-object 900 causes disturbance and thus it may be difficult to monitor a portion of the lateral side of and the side behind the unmanned transport vehicle 1 and the object 900 in some cases. For example, in a case where the unmanned transport vehicle 1 has an omnidirectional movement function and is movable also in the Y direction, it may be difficult to perform collision monitoring in the Y direction in some cases. Further, since the unmanned transport vehicle 1 enters below the loading portion 910 of the transport-object 900, it is difficult to dispose the bumper 30 on a side surface of the unmanned transport vehicle 1 as in the front side and stick it out in the Y direction due to interference by the caster 920 of the transport-object 900 and the like.

On the other hand, in the present embodiment, the unmanned transport vehicle 1 further includes the distance sensors 111 and 112 which detect an object present in at least one of the lateral side of and the side behind the vehicle body 10. In a case where at least a portion of the bumper 30 moves in the vehicle width direction, the distance sensors 111 and 112 move in the vehicle width direction accompanying the movement of the bumper 30. According to such a configuration, by changing positions of the distance sensors 111 and 112 in the Y direction, it is possible to reduce or eliminate the blind spot regions D caused due to disturbance by the transport-object 900. Thereby, obstacle detection capability can be further enhanced.

In the present embodiment, in a case where the width W2 of the transport-object 900 is larger than the width of the vehicle body 10, the bumper driver 40 extends the bumper 30 to a position at which the LRF detection regions R6 and R7 of the distance sensors 111 and 112 are not blocked due to the transport-object 900. That is, at the time of transport of the transport-object 900, the distance sensors 111 and 112 are moved to outer sides of the transport-object 900 by extending the bumper 30, and thereby a surroundings of the transport-object 900 can be viewed without the blind spot regions D. Further, according to the present embodiment, the bumper 30 can be suppressed from becoming excessively larger than the transport-object 900 and causing disturbance to the movement of the unmanned transport vehicle 1 by making an extension amount of the bumper 30 variable according to the size of the transport-object 900. Further, according to the present embodiment, when the unmanned transport vehicle 1 moves alone, a large margin can be obtained at the time of passing by an obstacle or another unmanned transport vehicle by contracting the bumper 30. Also, since a standby space at the time of charging or the like is reduced, an efficient operation is possible.

Further, the extension amount of the bumper 30 (positions of the first distance sensor 111 and second distance sensor 112) may be determined on the basis of the information acquired by the rear monitor 50 as in the first embodiment, instead of being determined by the control flow as described above. That is, the controller 60 may detect the width W2 (for example, the width of the loading portion 910) of the transport-object 900 on the basis of the information acquired by the rear monitor 50, and may set the extension amount of the bumper 30 (positions of the first distance sensor 111 and the second distance sensor 112) according to the detected width W2 of the transport-object 900.

Modified Example

Figure 19:
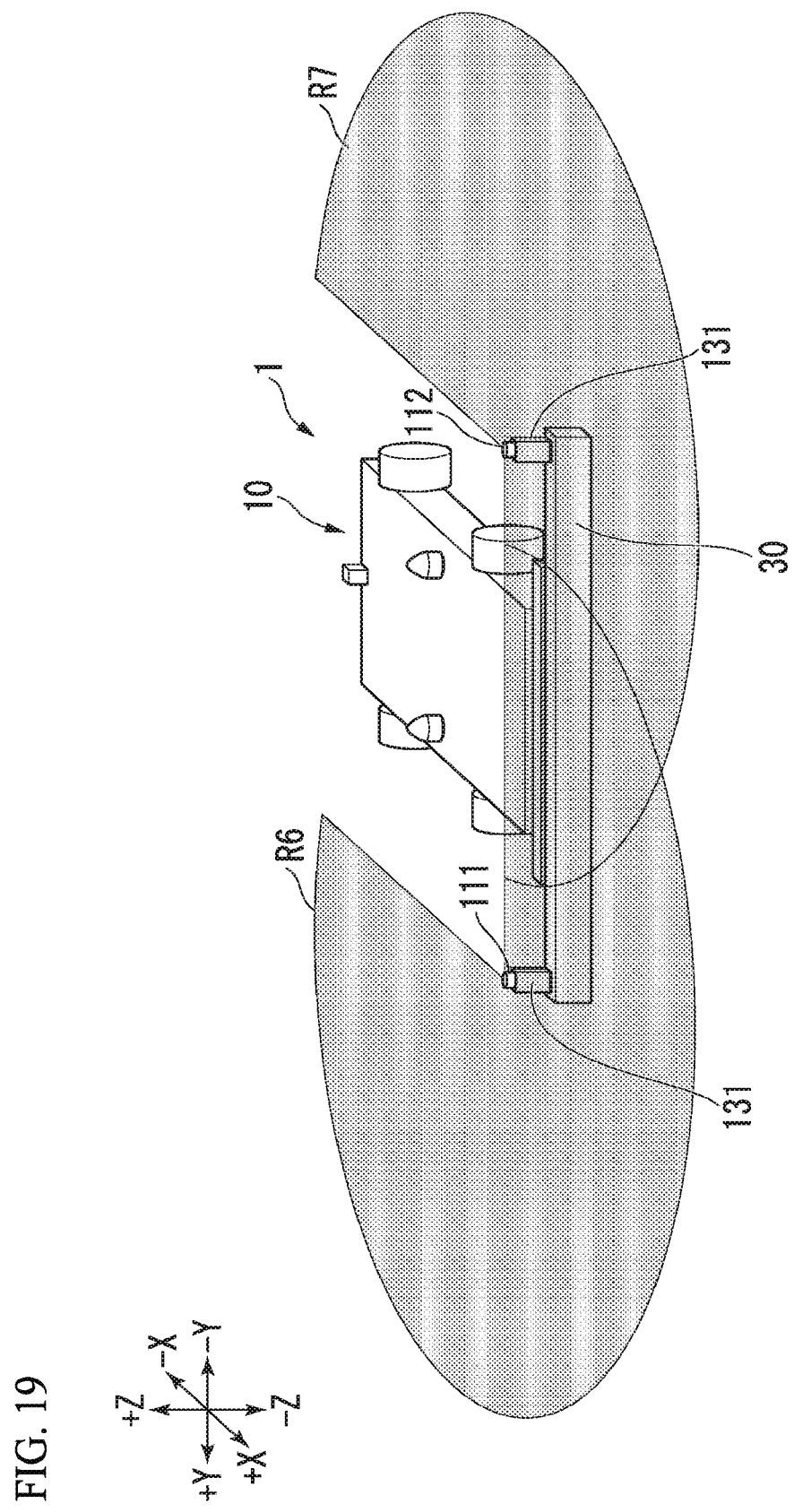
FIG. 19 is a perspective view showing an unmanned transport vehicle of a modified example of the fifth embodiment.

Next, a modified example of the fifth embodiment will be described. Configurations other than those described below in this modified example are the same as those in the fifth embodiment. FIG. 19 is a perspective view showing the unmanned transport vehicle 1 of the present modified example.

In this modified example, the bumper 30 includes height adjusters 131 capable of adjusting heights of the first distance sensor 111 and the second distance sensor 112 in the Z direction. The height adjuster 131 can be realized, for example, by a base portion that supports the first distance sensor 111 or the second distance sensor 112, a ball screw mechanism that moves the base portion in the Z direction, and the like, but it is not limited to these examples. The height adjuster 131 causes positions of the first distance sensor 111 and the second distance sensor 112 in the Z direction to be substantially the same height as that of the loading portion 910 of the transport-object 900. Then, the controller 60 extends the bumper 30 until the loading portion 910 is not detected within the LRF detection regions R6 and R7.

According to such a configuration, it is possible to adjust the extension amount of the bumper 30 (the positions of the first distance sensor 111 and the second distance sensor 112) on the basis of the width of the loading portion 910. In general, a width of the loading portion 910 is larger than a width between the plurality of casters 920. Therefore, in a case where the extension amount of the bumper 30 can be adjusted with respect to the width of the loading portion 910, the first distance sensor 111 and the second distance sensor 112 can be disposed at more appropriate positions (positions from which there are no blind spot regions D and at which a protruding amount from the loading portion 910 is small).

Sixth Embodiment

Next, a sixth embodiment will be described with reference to FIG. 20. In the sixth embodiment, directions of scanning planes of a first distance sensor 111 and a second distance sensor 112 are different from those of the fifth embodiment. Configurations other than those described below are the same as those in the fifth embodiment.

Figure 20:
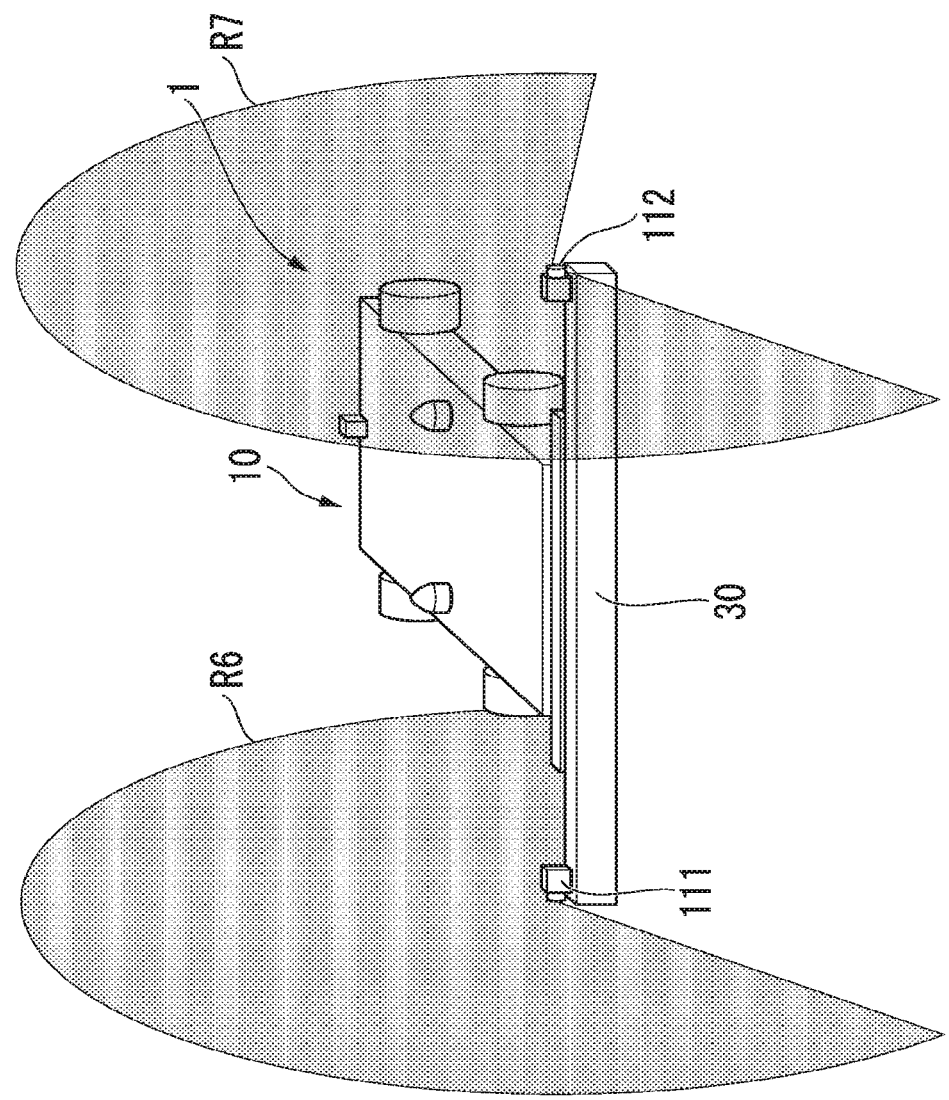
FIG. 20 is a perspective view showing an unmanned transport vehicle of a sixth embodiment.

FIG. 20 is a perspective view showing an unmanned transport vehicle 1 of the present embodiment. In the present embodiment, the unmanned transport vehicle 1 includes the first distance sensor 111 and the second distance sensor 112. In the present embodiment, each of the scanning planes (LRF detection regions R6 and R7) of the first distance sensor 111 and the second distance sensor 112 intersects, for example, a floor face on which the unmanned transport vehicle 1 moves (for example, substantially vertically). The detection regions R6 and R7 may be substantially parallel to the X direction. Also in this embodiment, the first distance sensor 111 and the second distance sensor 112 are examples of sensors at least capable of detecting objects arranged in the Y direction with respect to a vehicle body 10.

According to such a configuration, obstacle detection capability of the unmanned transport vehicle 1 can be enhanced. Further, according to such a configuration, by changing positions of the distance sensors 111 and 112 in the Y direction, it is possible to reduce or eliminate blind spot regions D caused due to disturbance by the transport-object 900. Thereby, obstacle detection capability can be further enhanced.

Seventh Embodiment

Next, a seventh embodiment will be described with reference to FIG. 21. The seventh embodiment is different from the fifth embodiment in types of distance sensors mounted on the unmanned transport vehicle 1. Configurations other than those described below are the same as those in the fifth embodiment.

Figure 21:
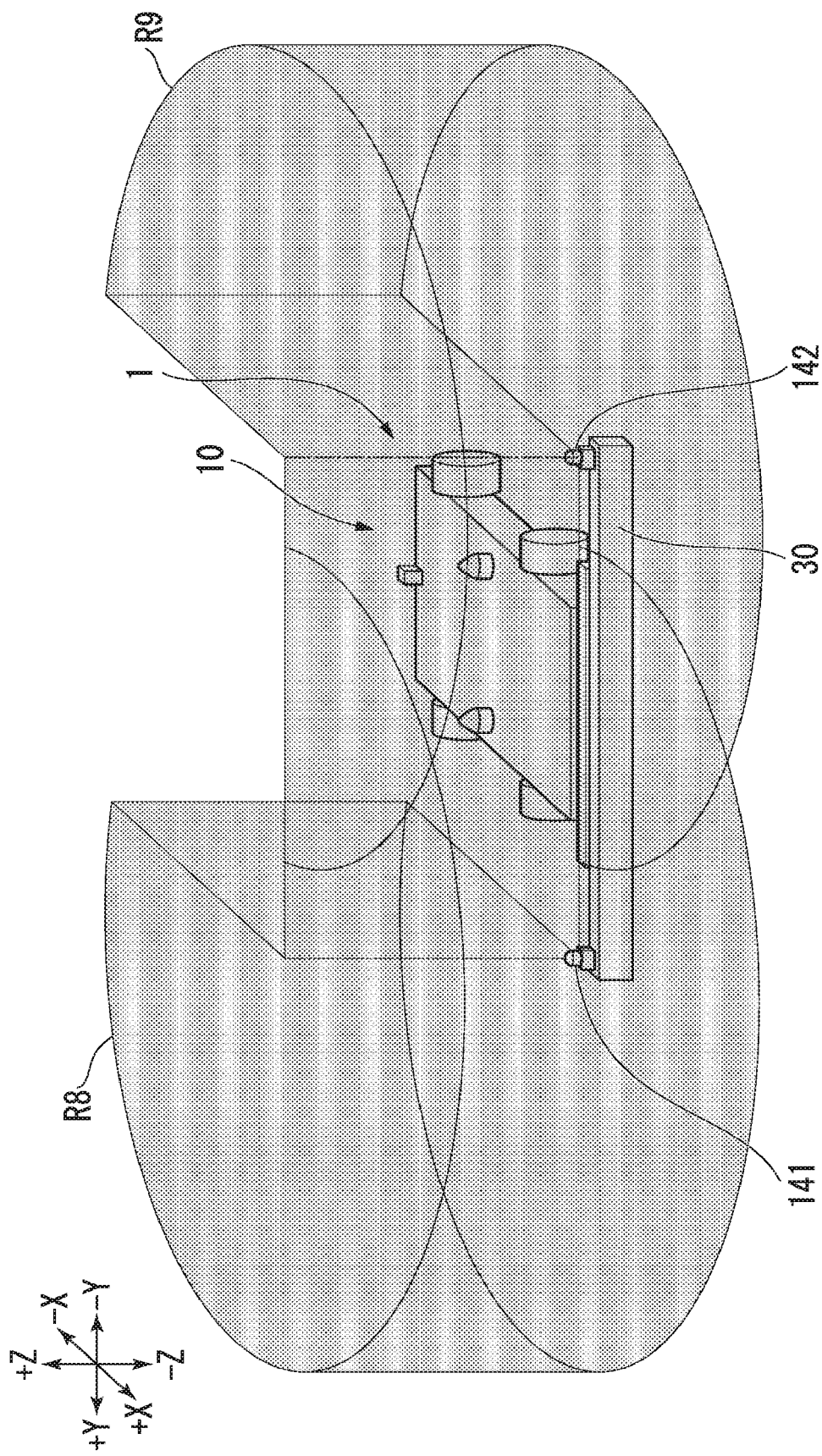
FIG. 21 is a perspective view showing an unmanned transport vehicle of a seventh embodiment.

FIG. 21 is a perspective view showing an unmanned transport vehicle 1 of the present embodiment. In the present embodiment, the unmanned transport vehicle 1 includes a first distance sensor 141 and a second distance sensor 142. In the present embodiment, each of the first distance sensor 141 and the second distance sensor 142 is a laser scanner that laser-scans a three-dimensional space. The first distance sensor 141 and the second distance sensor 142 each have detection regions R8 and R9 in a three-dimensional space. The first distance sensor 141 and the second distance sensor 142 are examples of sensors at least capable of detecting objects O arranged in the Y direction with respect to a vehicle body 10.

According to such a configuration, obstacle detection capability of the unmanned transport vehicle 1 can be enhanced. Further, according to such a configuration, by changing positions of the distance sensors 141 and 142 in the Y direction, it is possible to reduce or eliminate blind spot regions D caused due to disturbance by the transport-object 900. Thereby, obstacle detection capability can be further enhanced.

While preferred embodiments and modified examples have been described above, the embodiments are not limited to the above examples. For example, the above-described first to seventh embodiments and modified examples may be realized in combination with each other. Further, the bumper 30, and the above-described various detectors and sensors (for example, the detectors 81 and 82, the distance sensors 91, 92, 100, 111, 112, 141, and 142) provided in the bumper 30 may be provided on at least one of the −X direction side, the +Y direction side, and the −Y direction side with respect to the vehicle body 10, in addition to or instead of being provided on the +X direction side with respect to the vehicle body 10 and the bumper 30.

According to at least one embodiment described above, obstacle detection capability of the unmanned transport vehicle 1 can be enhanced by including a bumper adjacent to a vehicle body in a first direction and extendable and contractible in a second direction, and a bumper driver which drives the bumper by moving at least a portion of the bumper in the second direction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An unmanned transport vehicle comprising:
a vehicle body comprising a moving mechanism and a moving mechanism driver, the moving mechanism driver being configured to drive the moving mechanism;
a connector at the vehicle body, the connector being connectable to a transport-object;
a bumper adjacent to the vehicle body in a first direction, the bumper comprising a collision detection sensor, and being extendable and contractible in a second direction, the second direction intersecting the first direction; and
a bumper driver configured to extend and contract the bumper in the second direction by moving at least a portion of the bumper in the second direction.

2. The unmanned transport vehicle according to claim 1, wherein
the bumper driver moves the at least a portion of the bumper between a first position in which the at least a portion of the bumper is within a width of the vehicle body in the second direction and a second position in which the at least a portion of the bumper protrudes toward an outer side of the vehicle body in the second direction with respect to a side surface of the vehicle body.

3. The unmanned transport vehicle according to claim 2, wherein
the bumper driver moves the at least a portion of the bumper to the second position in a case where a width of the transport-object is larger than the width of the vehicle body in the second direction.

4. The unmanned transport vehicle according to claim 1, further comprising:
an information acquirer configured to acquire information relating to a width of the transport-object in the second direction; and
a controller configured to determine a drive amount of the bumper driver on the basis of the information acquired by the information acquirer.

5. The unmanned transport vehicle according to claim 1, wherein
the bumper comprising:
a first bumper portion movable in the second direction; and
a second bumper portion movable in a third direction opposite to the second direction.

6. The unmanned transport vehicle according to claim 1, further comprising
an upper detector at the bumper, the upper detector being configured to set a detection region above the bumper in a direction intersecting a horizontal plane,
wherein at least a portion of the upper detector moves in the second direction accompanying movement of the bumper in a case where the at least a portion of the bumper moves in the second direction.

7. The unmanned transport vehicle according to claim 1, further comprising
a lower detector at the bumper, the lower detector being configured to set a detection region below the bumper in a direction intersecting a horizontal plane,
wherein at least a portion of the lower detector moves in the second direction accompanying movement of the bumper in a case where at least a portion of the bumper moves in the second direction.

8. The unmanned transport vehicle according to claim 1, wherein
the bumper comprises a collision-receiving portion, the collision-receiving portion being on a side opposite to the vehicle body with respect to the collision detection sensor, and
the collision detection sensor is a mechanical limit switch and an input state thereof changes in a case where an external force acts on the collision-receiving portion.

9. The unmanned transport vehicle according to claim 1, wherein,
the bumper comprises a collision-receiving portion, the collision-receiving portion being on a side opposite to the vehicle body with respect to the collision detection sensor, and
the collision detection sensor is an electrical pressure-sensitive sensor and an input state thereof changes in a case where an external force acts on the collision-receiving portion.

10. The unmanned transport vehicle according to claim 1, further comprising
a sensor at an end portion of the bumper in the second direction, the sensor being able to at least detect an object arranged in the second direction with respect to the vehicle body,
wherein the sensor moves in the second direction accompanying movement of the bumper in a case where the at least a portion of the bumper moves in the second direction.

11. The unmanned transport vehicle according to claim 10, wherein
the bumper driver extends the bumper in the second direction to a position in which a detection region of the sensor is not blocked by the transport-object in a case where a width of the transport-object is larger than a width of the vehicle body in the second direction.

12. The unmanned transport vehicle according to claim 10, wherein
the sensor is a laser range finder which laser-scans along one plane in a space.

13. The unmanned transport vehicle according to claim 12, wherein
a scanning plane of the laser range finder is substantially parallel to a floor on which the vehicle body moves.

14. The unmanned transport vehicle according to claim 12, wherein
a scanning plane of the laser range finder intersects a floor on which the vehicle body moves.

15. The unmanned transport vehicle according to claim 10, wherein
the sensor is a laser scanner which laser-scans in a three-dimensional space.

16. The unmanned transport vehicle according to claim 10, wherein
the sensor is an optical sensor which measures in a single-axis direction in a space.

* * * * *